United States Patent
Paglieroni et al.

(10) Patent No.: US 8,854,249 B2
(45) Date of Patent: Oct. 7, 2014

(54) SPATIALLY ASSISTED DOWN-TRACK MEDIAN FILTER FOR GPR IMAGE POST-PROCESSING

(75) Inventors: David W. Paglieroni, Pleasanton, CA (US); N. Reginald Beer, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 552 days.

(21) Appl. No.: 13/219,493

(22) Filed: Aug. 26, 2011

(65) Prior Publication Data

US 2013/0082863 A1    Apr. 4, 2013

Related U.S. Application Data

(60) Provisional application No. 61/377,319, filed on Aug. 26, 2010, provisional application No. 61/377,324, filed on Aug. 26, 2010.

(51) Int. Cl.
| | |
|---|---|
| *G01S 13/00* | (2006.01) |
| *G01V 3/15* | (2006.01) |
| *G01S 13/89* | (2006.01) |
| *G01S 13/88* | (2006.01) |
| *G01V 3/12* | (2006.01) |
| *G01S 13/90* | (2006.01) |

(52) U.S. Cl.
CPC . *G01S 13/89* (2013.01); *G01V 3/15* (2013.01); *G01S 13/885* (2013.01); *G01S 13/003* (2013.01); *G01V 3/12* (2013.01); *G01S 13/90* (2013.01)
USPC ......... 342/22; 342/25 R; 342/25 A; 342/25 F; 342/159; 342/176; 342/179; 342/192; 342/195

(58) Field of Classification Search
USPC .......... 342/22, 25 R, 25 A, 25 B, 25 C, 25 D, 342/25 E, 25 F, 27, 159–164, 175, 176, 179, 342/191, 192, 195
See application file for complete search history.

(56) References Cited

U.S. PATENT DOCUMENTS

| | | | | |
|---|---|---|---|---|
| 4,783,753 | A * | 11/1988 | Crimmins | 382/275 |
| 4,839,654 | A * | 6/1989 | Ito et al. | 342/22 |
| 5,424,742 | A * | 6/1995 | Long et al. | 342/25 C |
| 5,430,445 | A * | 7/1995 | Peregrim et al. | 342/25 C |
| 5,796,363 | A * | 8/1998 | Mast | 342/22 |

(Continued)

OTHER PUBLICATIONS

U.S. Appl. No. 13/219,504, filed Aug. 26, 2011, Chambers et al.

(Continued)

*Primary Examiner* — Peter Bythrow
(74) *Attorney, Agent, or Firm* — Perkins Coie LLP

(57) ABSTRACT

A method and system for detecting the presence of subsurface objects within a medium is provided. In some embodiments, the imaging and detection system operates in a multistatic mode to collect radar return signals generated by an array of transceiver antenna pairs that is positioned across the surface and that travels down the surface. The imaging and detection system pre-processes the return signal to suppress certain undesirable effects. The imaging and detection system then generates synthetic aperture radar images from real aperture radar images generated from the pre-processed return signal. The imaging and detection system then post-processes the synthetic aperture radar images to improve detection of subsurface objects. The imaging and detection system identifies peaks in the energy levels of the post-processed image frame, which indicates the presence of a subsurface object.

20 Claims, 23 Drawing Sheets

(56) References Cited

U.S. PATENT DOCUMENTS

| | | | |
|---|---|---|---|
| 5,835,054 A * | 11/1998 | Warhus et al. | 342/22 |
| 7,034,740 B2 * | 4/2006 | Witten | 342/22 |
| 7,796,829 B2 * | 9/2010 | Nguyen et al. | 382/260 |
| 7,834,802 B2 * | 11/2010 | Keller et al. | 342/22 |
| 8,482,452 B2 * | 7/2013 | Chambers et al. | 342/22 |
| 8,508,403 B2 * | 8/2013 | Paglieroni et al. | 342/22 |
| 8,618,976 B2 * | 12/2013 | Paglieroni et al. | 342/22 |
| 8,659,467 B1 * | 2/2014 | Chambers et al. | 342/22 |
| 2004/0140924 A1 * | 7/2004 | Keller et al. | 342/22 |
| 2006/0164285 A1 * | 7/2006 | Fleisher | 342/22 |
| 2006/0164287 A1 * | 7/2006 | Holt et al. | 342/22 |
| 2007/0188371 A1 | 8/2007 | Callison | |
| 2009/0140907 A1 * | 6/2009 | Keller et al. | 342/22 |
| 2009/0161975 A1 * | 6/2009 | Asai et al. | 382/248 |
| 2012/0206293 A1 * | 8/2012 | Nguyen et al. | 342/25 F |
| 2013/0082856 A1 | 4/2013 | Paglieroni et al. | |
| 2013/0082857 A1 | 4/2013 | Beer et al. | |
| 2013/0082858 A1 | 4/2013 | Chambers et al. | |
| 2013/0082859 A1 | 4/2013 | Paglieroni et al. | |
| 2013/0082860 A1 | 4/2013 | Paglieroni et al. | |
| 2013/0082861 A1 * | 4/2013 | Paglieroni et al. | 342/22 |
| 2013/0082862 A1 | 4/2013 | Paglieroni et al. | |
| 2013/0082864 A1 | 4/2013 | Paglieroni et al. | |
| 2013/0082870 A1 | 4/2013 | Chambers et al. | |
| 2013/0085982 A1 | 4/2013 | Paglieroni et al. | |
| 2013/0251194 A1 * | 9/2013 | Schamp | 382/103 |

OTHER PUBLICATIONS

Aliferis, I. et al., "Comparison of the diffraction stack and time-reversal imaging algorithms applied to short-range UWB scattering data," *Proc. IEEE Int. Conf. Ultra-Wideband*, Singapore, pp. 618-621, 2007.

Ammari, H. et al., "MUSIC-type electromagnetic imaging of a collection of small three-dimensional inclusions," *SIAM J. Sci. Comput.*, vol. 29, No. 2, pp. 674-709, 2007.

Ammari, H. et al., "A MUSIC algorithm for locating small inclusions buried in a half-space from the scattering amplitude at a fixed frequency," *Multiscale Model. Simul.*, vol. 3, No. 3, pp. 597-628, 2005.

Beer, N.R. et al., "Computational system for detecting buried objects in subsurface tomography images reconstructed from multistatic ultra wideband ground penetrating radar data," *LLNL-12311*, pp. 1-11, 2010.

Belkebir, K., Bonnard, S. et al., "Validation of 2D inverse scattering algorithms from multi-frequency experimental data," *J. Electromag. Waves App.*, vol. 14:1637-1667, 2000.

Bellomo, L. et al., "Time reversal experiments in the microwave range: description of the radar and results," *Prog. Electromag. Res.*, vol. 104, pp. 427-448, 2010.

Chambers, D.H., "Target characterization using time-reversal symmetry of wave propagation," *Int. J. Mod. Phys. B*, vol. 21, No. 20, pp. 3511-3555, 2007.

Chambers, D.H. and J.G. Berryman, "Analysis of the time-reversal operator for a small spherical scatterer in an electromagnetic field," *IEEE Trans. Ant. Prop.*, vol. 52, No. 7, pp. 1729-1738, 2004.

Chambers, D.H. and J.G. Berryman, "Target characterization using decomposition of the time-reversal operator: electromagnetic scattering from small ellipsoids," *Inv. Prob.*, vol. 22, pp. 2145-2163, 2006.

Chambers, D.H. and J.G. Berryman, "Time-reversal analysis for scatterer characterization," *Phys. Rev. Lett.*, vol. 92, No. 2, pp. 023902-1-023902-4, 2004.

Chan, K.P. and Y.S. Cheung, "Fuzzy-attribute graph with application to chinese character recognition," *IEEE Transactions on Systems, Man, and Cybernetics*, vol. 22, No. 1:153-160, Jan./Feb. 1992.

Chatelée, V. et al., "Real data microwave imaging and time reversal," *IEEE APS Int. Symp.*, pp. 1793-1796, 2007.

Chauveau, J. et al., "Determination of resonance poles of radar targets in narrow frequency bands," *Proc. 4th Euro. Radar Conf.*, Munich, pp. 122-125, 2007.

Cmielewski, O. et al., "A two-step procedure for characterizing obstacles under a rough surface from bistatic measurements," *IEEE Trans. Geos. Rem. Sens.*, vol. 45, No. 9, pp. 2850-2858, 2007.

Counts, T. et al., "Multistatic ground-penetrating radar experiments," *IEEE Trans. Geos. Rem. Sens.*, vol. 45, No. 8, pp. 2544-2553, 2007.

Cresp, A. et al., "Investigation of time-reversal processing for surface-penetrating radar detection in a multiple-target configuration," *Proc. 5th Euro. Radar Conf.*, Amsterdam, pp. 144-147, 2008.

Cresp, A. et al., "Time-domain processing of electromagnetic data for multiple-target detection," *Conf. Math. Mod. Wave Phen.*, pp. 204-213, 2009.

Cresp, A. et al., "Comparison of the time-reversal and SEABED imaging algorithms applied on ultra-wideband experimental SAR data," *Proc. 7th Euro. Radar Conf.*, Paris, pp. 360-363, 2010.

Daniels, D.J. "Ground penetrating radar for buried landmine and IED detection," *Unexploded Ordnance Detection and Mitigation*, J. Byrnes (ed.), Springer, pp. 89-111, 2009.

Daniels, D.J., "A review of GPR for landmine detection," *Int. J. Sens. Imag.*, vol. 7, No. 3, pp. 90-123, 2006.

Daniels, D.J., "An assessment of the fundamental performance of GPR against buried landmines," *Detection and Remediation Technologies for Mines and Minelike Targets XII, Proc. SPIE*, vol. 6553, pp. 65530G-1-65530G-15, 2007.

Daniels, D.J. et al., "Classification of landmines using GPR," *IEEE RADAR '08, Proceedings*, pp. 1-6, 2008.

Devaney, A.J., "Time reversal imaging of obscured targets from multistatic data," *IEEE Trans. Ant. Prop.*, vol. 53, No. 5, pp. 1600-1619, May 2005.

Dubois, A. et al., "Localization and characterization of two-dimensional targets buried in a cluttered environment," *Inv. Prob.*, vol. 20, pp. S63-S79, 2004.

Dubois, A. et al., "Retrieval of inhomogeneous targets from experimental frequency diversity data," *Inv. Prob.*, vol. 21, pp. S65-S79, 2005.

Dubois, A. et al., "Imaging of dielectric cylinders from experimental stepped frequency data," *Appl. Phys. Lett.*, vol. 88, pp. 64104-1-164104-3, 2006.

Feng, X. and M. Sato, "Pre-stack migration applied to GPR for landmine detection," *Inv. Prob.*, vol. 20, pp. S99-S115, 2004.

Fink, M. et al., "Time-reversed acoustics," *Rep. Prog. Phys.*, vol. 63:1933-1995, 2000.

Fink, M. and C. Prada, "Acoustic time-reversal mirrors," *Inv. Prob.*, vol. 17, pp. R1-R38, 2001.

Gader, P. et al., "Detecting landmines with ground-penetrating radar using feature-based rules, order statistics, and adaptive whitening," *Trans. Geos. Rem. Sens.*, vol. 42, No. 11, pp. 2522-2534, 2004.

Gaunaurd, G.C. and L.H. Nguyen, "Detection of land-mines using ultra-wideband radar data and time-frequency signal analysis," *IEE Proc. Radar Sonar Navig.*, vol. 151, No. 5, pp. 307-316, 2004.

Gilmore, C. et al., "Derivation and comparison of SAR and frequency-wavenumber migration within a common inverse scalar wave problem formulation," *IEEE Trans. Geos. Rem. Sens.*, vol. 44, No. 6, pp. 1454-1461, 2006.

Grove, A.J. et al., "General convergence results for linear discriminant updates," *Proc. COLT 97*, ACM press, pp. 171-183, 1997.

Iakovleva, E. et al., "Multistatic response matrix of a 3-D inclusion in half space and MUSIC imaging," *IEEE Trans. Ant. Prop.*, vol. 55, pp. 2598-2607, 2007.

Iakovleva, E. and D. Lesselier, "Multistatic response matrix of spherical scatterers and the back propagation of singular fields," *IEEE Trans. Ant. Prop.*, vol. 56, No. 3, pp. 825-833, 2008.

Jofre, L. et al., "UWB tomographic radar imaging of penetrable and impenetrable objects," *Proc. IEEE*, vol. 97, No. 2, pp. 451-464, 2009.

Kuhn, H.W., "The Hungarian method for the assignment problem," *Naval Research Logistics Quarterly*, 2:83-97, 1955.

Lee, W-H. et al., "Optimizing the area under a receiver operating characteristic curve with application to landmine detection," *IEEE Trans. Geos. Rem. Sens.*, vol. 45, No. 2, pp. 389-397, 2007.

Mast, J.E. and E.M. Johansson, "Three-dimensional ground penetrating radar imaging using multi-frequency diffraction tomography," *SPIE*, vol. 2275, pp. 196-204, 1994.

(56) References Cited

OTHER PUBLICATIONS

Johansson, E.M. and J. Mast, "Three-dimensional ground penetrating radar imaging using synthetic aperture time-domain focusing," *SPIE*, vol. 2275, pp. 205-214, 1994.

Micolau, G. and M. Saillard, "DORT method as applied to electromagnetic subsurface imaging," *Radio Sci.*, vol. 38, No. 3, 1038, pp. 4-1-4-12, 2003.

Micolau, G. et al., "DORT method as applied to ultrawideband signals for detection of buried objects," *IEEE Trans. Geos. Rem. Sens.*, vol. 41, No. 8, pp. 1813-1820, 2003.

Paglieroni, D. and F. Nekoogar, "Matching random tree models of spatio-temporal patterns to tables or graphs," *IEEE Symposium on Computational Intelligence and Data Mining*, pp. 1-8, Apr. 1-5, 2007.

Paglieroni, D., and K. Ni, "DART Queries," *IEEE Transactions on Knowledge and Data Engineering, in Revision*, LLNL-JRNL-418760, 2010.

Paglieroni, D.W. et al., "DART-based threat assessment for buried objects Detected with a ground penetrating radar over time," LLNL, pp. 1-7, 2010.

Prada, C. and M. Fink, "Eigenmodes of the time reversal operator: A solution to selective focusing in multiple-target media," *Wave Motion*, vol. 20, pp. 151-163, 1994.

Saillard, M. et al., "Reconstruction of buried objects surrounded by small inhomogeneities," *Inv. Prob.*, vol. 16, pp. 1195-1208, 2000.

Soumekh, M. et al., "3D wavefront image formation for NIITEK GPR," *Radar Sensor Technology XIII Proc. SPIE*, vol. 7308, pp. 73080J-1-73080J-12, 2009.

Throckmorton, C. et al., "The efficacy of human observation for discrimination and feature identification of targets measured by the NIITEK ground penetrating radar," *Detection and Remediation Technologies for Mines and Minelike Targets IX, Proc. SPIE*, vol. 5415, pp. 963-972, 2004.

Torrione, P.A. et al., "Performance of an adaptive feature-based processor for a wideband ground penetrating radar system," *IEEE Trans. Aerospace Elec. Systems*, pp. 1-10, 2006.

Torrione, P.A. and L.M. Collins, "Texture features for antitank landmine detection using ground penetrating radar," *IEEE Trans. Geos. Rem. Sens.*, vol. 45, No. 7, pp. 2374-2382, 2007.

Torrione, P.A. et al., "Constrained filter optimization for subsurface landmine detection," *Detection and Remediation Technologies for Mines and Minelike Targets XI, Proc. SPIE*, vol. 6217, pp. 621710X-1-621710X-12, 2006.

Torrione, P.A., Collins, L. et al., "Application of the LMS algorithm to anomaly detection using the Wichmann/NIITEK ground penetrating radar," *Detection and Remediation Technologies for Mines and Minelike Targets VIII, Proc. SPIE*, vol. 5089, pp. 1127-1136, 2003.

Tortel, H. et al., "Decomposition of the time reversal operator for electromagnetic scattering," *J. Electromag. Waves. App.*, vol. 13, pp. 687-719, 1999.

Tsai, W-H and K-S Fu, Error-Correcting Isomorphisms of Attributed Relational Graphs for Pattern Analysis, *IEEE Transactions on Systems, Man, and Cybernetics*, vol. 9, No. 12, pp. 757-768, 1979.

Vitebskiy, S., Carin, L., "Resonances of perfectly conducting wires and bodies of revolution buried in a lossy dispersive half-space," *IEEE Trans. Ant. Prop.*, vol. 44, No. 12, pp. 1575-1583, 1996.

Vitebskiy, S. et al., "Short-pulse plane-wave scattering from buried perfectly conducting bodies of revolution," *IEEE Trans. Ant. Prop.*, vol. 44, No. 2, pp. 143-151, 1996.

Wilson, J.N. et al., "A large-scale systematic evaluation of algorithms using ground-penetrating radar for landmine detection and discrimination," *IEEE Trans. Geos. Rem. Sens.*, vol. 45, No. 8, pp. 2560-2572, 2007.

Yavuz, M.E. and F.L. Teixeira, "Full time-domain DORT for ultrawideband electromagnetic fields in dispersive, random inhomogeneous media," *IEEE Trans. Ant. Prop.*, vol. 54, No. 8, pp. 2305-2315, 2006.

Yavuz, M.E. and F.L. Teixeira, "On the sensitivity of time-reversal imaging techniques to model perturbations," *IEEE Trans. Ant. Prop.*, vol. 56, No. 3, pp. 834-843, 2008.

Yavuz, M.E. and F.L. Teixeira, "Space-frequency ultrawideband time-reversal imaging," *IEEE Trans. Geos. Rem. Sens.*, vol. 46, No. 4, pp. 1115-1124, 2008.

Zhu, Q. and L.M. Collins, "Application of feature extraction methods for landmine detection using the Wichmann/NIITEK ground-penetrating radar," *IEEE Trans. Geos. Rem. Sens.*, vol. 43, No. 1, pp. 81-85, 2005.

Zhuge, X. et al., "UWB array-based radar imaging using modified Kirchhoff migration," *Proc. 2008 IEEE Conf. Ultra-Wideband*, vol. 3, pp. 175-178, 2008.

\* cited by examiner

SPATIALLY ASSISTED DOWN-TRACK MEDIAN FILTER FOR GPR IMAGE POST-PROCESSING

CROSS-REFERENCE TO RELATED APPLICATION(S)

This application claims the benefit of U.S. Provisional Patent Application No. 61/377,319 filed Aug. 26, 2010, entitled "COMPUTATIONAL SYSTEM FOR DETECTING BURIED OBJECTS IN SUBSURFACE TOMOGRAPHY IMAGES RECONSTRUCTED FROM MULTISTATIC ULTRA WIDEBAND GROUND PENETRATING RADAR DATA," and U.S. Provisional Patent Application No. 61/377,324, filed Aug. 26, 2010, entitled "DART-BASED THREAT ASSESSMENT FOR BURIED OBJECTS DETECTED WITH A GROUND PENETRATING RADAR OVER TIME," which are incorporated herein by reference in their entirety.

This application is related to U.S. patent application Ser. No. 13/219,425, filed Aug. 26, 2011, entitled "ATTRIBUTE AND TOPOLOGY BASED CHANGE DETECTION IN A CONSTELLATION OF PREVIOUSLY DETECTED OBJECTS," U.S. patent application Ser. No. 13/219,430, filed Aug. 26, 2011, issued as U.S. Pat. No. 8,681,036, entitled "DISTRIBUTED ROAD ASSESSMENT SYSTEM," and U.S. patent application Ser. No. 13/219,435, filed Aug. 26, 2011, entitled "CLASSIFICATION OF SUBSURFACE OBJECTS USING SINGULAR VALUES DERIVED FROM SIGNAL FRAMES," which are incorporated herein by reference in their entirety.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Many scientific, engineering, medical, and other technologies seek to identify the presence of an object within a medium. For example, some technologies detect the presence of buried landmines in a roadway or a field for military or humanitarian purposes. Such technologies may use ultra wideband ground-penetrating radar ("GPR") antennas that are mounted on the front of a vehicle that travels on the roadway or across the field. The antennas are directed into the ground with the soil being the medium and the top of the soil or pavement being the surface. GPR systems can be used to detect not only metallic objects but also non-metallic objects whose dielectric properties are sufficiently different from those of the soil. When a radar signal strikes a subsurface object, it is reflected back as a return signal to a receiver. Current GPR systems typically analyze the strength or amplitude of the return signals directly to identify the presence of the object. Some GPR systems may, however, generate tomography images from the return signals. In the medical field, computer-assisted tomography uses X-rays to generate tomography images for detecting the presence of abnormalities (i.e., subsurface objects) within a body. In the engineering field, GPR systems have been designed to generate spatial images of the interior of concrete structures such as bridges, dams, and containment vessels to assist in assessing the integrity of the structures. In such images, the subsurface objects represented by such images tend to appear as distinct bright spots. In addition to referring to a foreign object that is within a medium, the term "object" also refers to any characteristic of the medium (e.g., crack in the medium and change in medium density) that is to be detected.

Using current imaging techniques, computational systems attached to arrays that contain dozens of antenna are unable to produce radar tomography images of the subsurface in real-time. A real-time system needs to process the return signals from successive sampling locations of the vehicle as it travels so that, in the steady state, the return signals for one sampling location are processed within the time between samplings. Moreover, in the case of a vehicle that detects landmines, a real-time system may need to detect the presence of the landmine in time to stop the vehicle from hitting the landmine.

SUMMARY

Real-Time System for Imaging and Object Detection with a Multistatic GPR Array

A method for detecting presence of a subsurface object in a medium is provided. The method includes, for each of a plurality of down-track locations, acquiring return signals at receivers from signals emitted by transmitters into the medium, the transmitters and receivers operating in a multi-static mode; pre-processing the return signals to suppress effects of extraneous signals; for each down-track location, generating a real aperture radar image from the pre-processed return signals for that down-track location; for each down-track location, generating a synthetic aperture radar image from the real aperture radar images of that down-track location and adjacent down-track locations; post-processing the synthetic aperture radar images to separate objects in the foreground from clutter and medium in the background by filtering out effects of clutter followed by restoring spots within the filtered images to their pre-filtered values; for each down-track location, generating a statistic based on energy of a restored spot within the filtered image for that down-track location; identifying down-track locations with peaks in the generated statistics; upon identifying a down-track location with a peak, indicating the presence of a subsurface object at that down-track location. The method may also be wherein the medium is ground and the transmitters and receivers form a linear array of transceivers. The method may also be wherein the return signals are acquired and the presence of a subsurface object is indicated in real-time. The method may also be wherein the pre-processing of current return signals includes calculating an estimated background signal for a current return signal based on a combination of an estimated background signal for a prior return signal for a prior down-track location that has the same transmitter and receiver pair and a similar air gap to the current return signal and an estimated gain and bias adjusted return signal for the prior return signal; calculating a gain and bias adjusted return signal for the current return signal; and calculating an estimated foreground signal for the current return signal based on a difference between the gain and bias adjusted return signal for the current return signal and the estimated background signal for the current return signal. The method may also be wherein the generating of a real aperture radar image for a down-track location includes performing a plane-to-plane propagation of the return signals to generate a contribution image frame; generating a contribution from each transmitter to the real aperture image using an aperture weighting function to generate a weighted sum of a component of that contribution from each receiver; and generating the real aperture image for that down-track location by summing the contributions from each transmitter. The method may also be wherein the post-processing of a synthetic aperture radar image includes applying a filter to the image to generate a filtered image, the filtered image having an original spot of pixels; designating that the pixels of the original spot are within an enlarged spot and that pixels in a region adjacent to the original spot that satisfy restoration criterion are also within the enlarged spot; and setting values of the pixels based on whether the pixels are in the enlarged spot. The method may also be wherein the generating of the statistic for a down-track location includes calculating energy of pixels in the synthetic aperture image frame for the down-track location; calculating a spot energy of pixels within the restored spot; and setting the statistic based on a ratio of the spot energy to the energy of pixels. The method may also be wherein the surface is ground and a subsurface object is a buried explosive.

A computer-readable storage device storing computer-executable instructions for controlling a computing device to detect presence of a subsurface object in a medium is provide. The detecting of presence is performed by a method. The method, for each of a plurality of down-track locations, acquires return signals at receivers from signals emitted by transmitters into the medium, the transmitters and receiver forming a linear array of transceivers, pre-processes the return signals to suppress effects of extraneous signals; for each down-track location, generates a synthetic aperture radar image representing a subsurface image at that down-track location from the pre-processed return signals; post-processes the synthetic aperture radar images to separate objects in the foreground from clutter and medium in the background by filtering out effects of clutter; for each down-track location, generates a statistic based on energy of a spot within the filtered image for that down-track location; identifies down-track locations with peaks in the generated statistics; and upon identifying a down-track location with a peak, indicates the presence of a subsurface object at that down-track location. The method may also be wherein the medium is ground and the method is for detecting presence of buried explosives. The method may also be wherein the return signals are acquired and the presence of a subsurface object is indicated in real-time. The method may also be wherein the pre-processing of current return signals includes calculating an estimated background signal for a current return signal based on a combination of an estimated background signal for a prior return signal for a prior down-track location that has a similar time delay between when the transmitter emits the signal and when a return signal that bounces off a surface is acquired by the receiver and an estimated gain and bias adjusted return signal for the prior return signal; calculating a gain and bias adjusted return signal for the current return signal; and calculating an estimated foreground signal for the current return signal based on a difference between the gain and bias adjusted return signal for the current return signal and the estimated background signal for the current return signal. The method may also be wherein the generating of a synthetic aperture radar image includes for each down-track location generating a real aperture radar image, the generating including performing a plane-to-plane propagation of the return signals to generate a contribution image frame; generating a contribution from each transmitter to the real aperture image using an aperture weighting function to generate a weighted sum of a component of that contribution from each receiver; and generating the real aperture image for that down-track location by summing the contributions from each transmitter. The method may also be wherein the post-processing of a synthetic aperture radar image includes applying a filter to the image to generate a filtered image, the filtered image having an original spot of pixels; designating that the pixels of the original spot are within an enlarged spot and that pixels in a region adjacent to the original spot that satisfy restoration criterion are also within the enlarged spot; and setting values of the pixels based on whether the pixels are in the enlarged spot. The method may also be wherein the generating of the statistic for a down-track location includes calculating energy of pixels in the synthetic aperture image frame for the down-track location; calculating a spot energy of pixels within the restored spot; and setting the statistic based on a ratio of the spot energy to the energy of pixels.

A computing device for detecting presence of a subsurface object in a medium from return signal acquired at a plurality of down-track locations by receivers from signals emitted by transmitters into the medium is provided. The transmitters and receivers operates in a multistatic mode The device includes a component that pre-processes the return signals to suppress effects of extraneous signals; a component that, for each down-track location, generates a real aperture radar image from the pre-processed return signals for that down-track location; a component that, for each down-track location, generates a synthetic aperture radar image from the real aperture radar images of that down-track location and adjacent down-track locations; a component that post-processes the synthetic aperture radar images to separate objects in the foreground from clutter and medium in the background by filtering out effects of clutter followed by restoring spots within the filtered images to their pre-filtered values; a component that, for each down-track location, generates a statistic based on energy of a restored spot within the filtered image for that down-track location; and a component that indicates the presence of a subsurface object at a down-track location having a statistic that represents a location peak in the statistics. The computing device may also be wherein the component that pre-processes the return signals wherein the pre-processing includes calculating an estimated background signal for a current return signal based on a combination of an estimated background signal for a prior return signal for a prior down-track location that has a similar air gap to the current return signal and an estimated gain and bias adjusted return signal for the prior return signal; calculating a gain and bias adjusted return signal for the current return signal; and calculating an estimated foreground signal for the current return signal based on a difference between the gain and bias adjusted return signal for the current return signal and the estimated background signal for the current return signal. The computing device may also be wherein the component that generates a real aperture radar image for a down-track location performs a plane-to-plane propagation of the return signals to generate a contribution image frame; generates a contribution from each transmitter to the real aperture image using an aperture weighting function to generate a weighted sum of a component of that contribution from each receiver; and generates the real aperture image for that down-track location by summing the contributions from each transmitter. The computing device may also be wherein the component that post-processes a synthetic aperture radar image applies a filter to the image to generate a filtered image, the filtered image having an original spot of pixels; designates that the pixels of the original spot are within an enlarged spot and that pixels in a region adjacent to the original spot that satisfy restoration criterion are also within the enlarged spot; and sets values of the pixels based on whether the pixels are in the enlarged spot. The computing device may also be wherein the component that generates the statistic for a down-track location calculates energy of pixels in the synthetic aperture image frame for the down-track location; calculates a spot energy of pixels within the restored spot; and sets the statistic based on a ratio of the spot energy to the energy of pixels.

Radar Signal Pre-Processing to Suppress Surface Bounce and Multipath

A method performed by a computing device for suppressing effects of extraneous signals in a current return signal acquired by a receiver from a signal emitted by a transmitter is provided. The current return signal is collected at a current cross-track location of a current down-track location. The method includes calculating an estimated background signal for the current return signal based on a combination of an estimated background signal for a prior return signal for a prior down-track location that has a similar air gap to the current return signal and an estimated gain and bias adjusted return signal for the prior return signal; calculating a gain and bias adjusted return signal for the current return signal; and calculating an estimated foreground signal for the current return signal based on a difference between the gain and bias adjusted return signal for the current return signal and the estimated background signal for the current return signal. The method may also include calculating an adaptation parameter based on disparity between the gain and bias adjusted return signal and the estimated background signal for the prior return signal and wherein the calculating of the estimated background signal for the current return signal weights the estimated background signal for a prior return signal and the estimated gain and bias adjusted return signal for the prior return signal based on the adaptation parameter. The method may also be wherein the adaptation parameter decreases with increasing disparity between the estimated background signal for the prior return signal and the estimated gain and bias adjusted return signal for the prior return signal. The method may also be wherein the disparity is a sum of differences between the estimated background signal for the prior return signal and the estimated gain and bias adjusted return signal for the prior return signal. The method may also be wherein wherein the adaptation parameter is based on a mean of disparities of prior down-track locations and a standard deviation of disparities of prior down-track locations. The method may also be wherein the air gap is a time delay between when the transmitter emits the signal and a return signal that bounces off a surface is acquired by the receiver. The method may also be wherein the transmitter and receiver are within a linear array of transceivers that operates in a multistatic mode. The method may also be wherein emitted signals are emitted into a medium having a surface and including, for each of a plurality of down-track locations, for each of a plurality of cross-track locations for each down-track location, calculating an estimated foreground signal for the return signal for that cross-track location; and detecting an object below the surface of medium from the estimated foreground signals for the return signals. The method may also be wherein the prior return signal was acquired by the same receiver from a signal emitted by the same transmitter.

A computer-readable storage device storing computer-executable instructions for controlling a computing device to suppress effects of extraneous signals in return signals acquired by receivers from ground-penetrating radar signals emitted by transmitters operating in a multistatic mode is provided. The suppressing is performed by a method comprising receiving return signals for each transmitter and receiver pair at each of a plurality of down-track locations; and for each current return signal, calculating an estimated background signal for the current return signal based on an estimated background signal for a prior return signal for a prior down-track location that has a similar air gap to the current return signal and an estimated gain and bias adjusted return signal for the prior return signal; calculating a gain and bias adjusted return signal for the current return signal; and calculating an estimated foreground signal for the current return signal based on a difference between the gain and bias adjusted return signal for the current return signal and the estimated background signal for the current return signal. The method may also include calculating an adaptation parameter based on disparity between the gain and bias adjusted return signal and the estimated background signal for the prior return signal and wherein the calculating of the estimated background signal for the current return signal weights the estimated background signal for a prior return signal and the estimated gain and bias adjusted return signal for the prior return signal based on the adaptation parameter. The method may also be wherein the adaptation parameter decreases with increasing disparity between the estimated background signal for the prior return signal and the estimated gain and bias adjusted return signal for the prior return signal. The method may also be wherein the disparity is a sum of differences between the estimated background signal for the prior return signal and the estimated gain and bias adjusted return signal for the prior return signal. The method may also be wherein the adaptation parameter is based on a mean of disparities of prior down-track locations and a standard deviation of disparities of prior down-track locations. The method may also be wherein emitted signals are emitted into a medium having a surface and including detecting an object below the surface of the medium from the estimated foreground signals for the return signals.

A computing device for suppressing effects of extraneous signals in a current return signal acquired by a receiver from a signal emitted by a transmitter is provided. The signal is a ground-penetrating radar signal emitting towards the ground. The current return signal has a plurality of samples corresponding to times at which the return signal was sampled by the receiver. The current return signal is collected at current down-track location. The computing device comprises a component that generates an adaptation parameter based on disparity between an estimated background signal for a prior return signal for a prior down-track location that has a similar time delay between when the transmitter emits the signal and a return signal that bounces off a surface is acquired by the receiver as the current return signal and an estimated gain and bias adjusted return signal for the prior return signal; a component that generates an estimated background signal for the current return signal as a combination of the estimated background signal for the prior return signal and the estimated gain and bias adjusted return signal for the prior return signal, the combination being weighted by the adaptation parameter; a component that generates a gain and bias adjusted return signal for the current return signal; and a component that generates an estimated foreground signal for the current return signal based on a difference between the gain and bias adjusted return signal for the current return signal and the estimated background signal for the current return signal. The computing device may also be wherein the adaptation parameter is based on a mean of disparities of prior down-track locations and a standard deviation of disparities of prior down-track locations. The computing device may also be wherein the transmitter and receiver are within a linear array of transceivers that operates in a multistatic mode. The computing device may also include a component that for each of a plurality of down-track locations and for each of a plurality of cross-track locations for each down-track location, generates an estimated foreground signal for the return signal for that cross-track location; and a component that detects a buried object from the estimated foreground signals for the return signals. The computing device may also be wherein the buried object is an explosive device.

Spatially Adaptive Migration Tomography for Multistatic GPR Imaging

A method performed by a computing device for generating an image frame from multistatic ground-penetrating radar ("GPR") return signals of multiple transceivers is provided. The return signals are acquired by multiple receivers from each signal emitted by each of multiple transmitters. The method comprises for each column of the image frame, identifying contributing transmitter and receiver pairs that are in a neighborhood of a transceiver that is closest to the column, the neighborhood being defined by a multistatic degree, being less than all of the transmitter and receiver pairs, and including the transmitter and receiver pair of the transceiver that is closest to the column; and generating values for pixels of that column of the image frame using contributing samples of return signals of the contributing transmitter and receiver pairs. The method may also be wherein the multistatic degree defines a number of adjacent transmitters and receivers that, on either side of the transceiver that is closest to a column, that are contributing transmitter and receiver pairs for the pixels in the column. The method may also be wherein the multistatic degree is specified by a user. The method may also include dynamically identifying weights of the contributing transmitter and receiver pairs to a pixel based on statistical significance of the contributing sample of the return signal of each contributing transmitter and receiver pair to the value of a pixel. The method may also be wherein the return signals for the image frame are acquired for a down-track location and the statistical significance of a contributing transmitter and receiver pair to the value of a pixel is based on comparison of contributing samples of the return signal of that contributing transmitter and receiver pair to pixels of a row of the image frame that contains the pixel based on a mean and standard deviation of the contributing samples of the contributing transmitter and receiver pairs from prior down-track locations that contribute to pixels in the row. The method may also be wherein the statistical significance is based on an unsupervised binary classifier. The method may also be wherein the unsupervised binary classifier determines statistical significance for a pixel by calculating a running mean and standard deviation in a left direction and a right direction of weighted contributing samples of the return signal of each transmitter and receiver pair, the contributing samples being sorted based on magnitude of the contributing samples, selecting a threshold value from the running means and standard deviations, and indicating that transmitter and receiver pairs with magnitudes of samples that is greater than the threshold value are contributing transmitter and receiver pairs. The method may also be wherein wherein when the identified weight for a contributing transmitter and receiver pairs to a pixel is less than a contribution threshold, discarding the contributing sample of the return signal of that contributing transmitter and receiver pair so that that contributing sample does not contribute to the value of the pixel.

A computer-readable storage device storing computer-executable instructions for controlling a computing device to generate an image frame from multistatic ground-penetrating radar ("GPR") return signals of multiple transceivers is provided. The return signals are acquired by multiple receivers from each signal emitted by each of multiple transmitters. The generating is by a method comprising, for each of a plurality of pixels in the image frame, dynamically identifying contributing transmitter and receiver pairs whose return signals are to contribute to the pixel; and generating a value for the pixel from a contributing sample of the return signal of each contributing transmitter and receiver pair. The method may also include, for each of a plurality of pixels in the image frame, applying an image segmentation algorithm to a matrix of weighted return signals, the matrix having a row and a column for each transmitter and receiver pair with an element that is a weighted contributing sample based on statistical significance of the contributing sample of the transmitter and receiver pair to the pixel, the image segmentation algorithm identifying a region of transmitter and receiver pairs whose weighted samples are the contributing transmitter and receiver pairs. The method may also be wherein the contributing transmitter and receiver pairs are the same for each pixel in a column of the image frame. The method may also be wherein the dynamically identifying of the contributing transmitter and receiver pairs applies an unsupervised binary classifier to the contributing sample of each transmitter and receiver pair. The method may also be wherein the unsupervised binary classifier identifies the contributing transmitter and receiver pairs based on statistical significance that is determined by calculating a running mean and standard deviation in a left direction and a right direction on the contributing sample of each transceiver and receiver pair, the contributing samples being sorted based on magnitude of the contributing samples, selecting a threshold value from the running means and standard deviations, and indicating that transmitter and receiver pairs with magnitudes of contributing samples that are greater than the threshold value are contributing transmitter and receiver pairs. The method may also be wherein the contributing samples used by the unsupervised binary classifier are weighted contributing samples based on statistical significance of the contributing samples to the pixel.

A computing device for generating an image frame from multistatic ground-penetrating radar ("GPR") return signals of multiple transceivers is provided. The return signals are acquired by multiple receivers from each signal emitted by each of multiple transmitters. The computing device comprising a data store that specifies a subset of transmitter and receiver pairs as contributing transmitter and receiver pairs whose return signals contribute to a pixel of the image frame; and a component that generates values for the pixel of the image frame using contributing samples of the return signals of the contributing transmitter and receiver pairs. The computing device may also be wherein the contributing transmitter and receiver pairs are in a neighborhood of a transceiver that is closest to the pixel of the image frame, the neighborhood being defined by a multistatic degree and including the transmitter and receiver pair of the transceiver that is closest to the column. The computing device may also be wherein the multistatic degree defines a number of adjacent transmitters and receivers, on either side of the transceiver that is closest to a pixel, that are contributing transmitter and receiver pairs for the pixel. The computing device may also include a component that dynamically identifies weights of the contributing transmitter and receiver pairs to the pixel based on statistical significance of the contributing sample of the return signal of each contributing transmitter and receiver pair to the value of the pixel. The computing device may also be wherein the return signals for the image frame are acquired for a down-track location and the statistical significance of a contributing transmitter and receiver pair to the value of the pixel is based on comparison of contributing samples of the return signal of that contributing transmitter and receiver pair to pixels of a row of the image frame that contains the pixel based on a mean and standard deviation of the contributing samples of the contributing transmitter and receiver pairs from prior down-track locations that contribute to pixels in the row. The computing device may also be wherein the component that dynamically identifies weight includes an unsupervised binary classifier that determines statistical significance for the pixel by calculating a running mean and standard deviation in a left direction and a right direction of weighted contributing samples of the return signal of each transmitter and receiver pair to the pixel, the contributing samples being sorted based on magnitude of the contributing samples, selecting a threshold value from the running means and standard deviations, and indicating that transmitter and receiver pairs with magnitudes of samples that is greater than the threshold value are contributing transmitter and receiver pairs.

Zero Source Insertion Technique to Account for Undersampling in GPR Imaging

A method of generating a contribution image frame for a transmitter based on return signals acquired by multiple receivers from a signal emitted by the transmitter at a down-track location is provided. The receivers are at cross-track locations. The method comprises providing a matrix of the return signals with each column representing a receiver and each row representing a fast time delay; applying a fast Fourier transform separately to each column of the matrix to generate a column transformed matrix; applying a fast Fourier transform separately to each row of the column transformed matrix to generate a row transformed matrix; inserting columns of zeros into the row transformed matrix to account for under-sampling in a cross-track direction to generate a zero inserted matrix; applying an inverse fast Fourier transform separately to each row of the zero inserted matrix to generate an inverse row transformed matrix; applying an inverse fast Fourier transform separately to each column of the inverse row transformed matrix to generate an inverse column transformed matrix; and creating the contribution image frame from elements of the inverse column transformed matrix. The method may also be wherein the number of columns of zeros inserted between each column of the row transformed matrix is sufficient to ensure that the total number of columns in the cross-track direction is greater than the width of the contribution image frame divided by a pixel width in an image frame. The method may also be wherein the number of columns of zeros is based on the sampling theorem. The method may also be wherein the emitted signal is a ground-penetrating radar signal that is emitted into the ground for detecting a buried explosive device. The method may also include creating a contribution image frame for each of a plurality of transmitters at the down-track location and generating a real aperture image for the down-track location from the created contribution image frames. The method may also be wherein the transmitters and receivers operate in a multistatic mode. The method may also include generating real aperture images for a plurality of down-track locations and generating a synthetic aperture image for a target down-track location from the real aperture images of adjacent down-track locations.

A computer-readable storage device storing computer-executable instructions for controlling a computing device to generate a contribution image frame for a transmitter based on return signals acquired by multiple receivers from a signal emitted by the transmitter is provided. The receivers are at locations. The return signal for each receiver includes a number of samples indicating amplitude of the return signal. Each sample corresponds to a fast time delay at which the signal emitted by the transmitter was acquired by that receiver. The generating is performed by a method comprising transforming the return signal of each receiver from a time domain into a frequency domain to generate first transformed return signals; transforming the first transformed return signals across the receivers for each fast time delay in a frequency domain to generate second transformed return signals; augmenting the second transformed return signals with zero return signals to represent virtual receivers to account for under-sampling by the receivers to generate zero inserted return signals; inversely transforming the zero inserted return signals across the receivers for each fast time delay to generate first inverse transformed return signals; inversely transforming the first inverse transformed return signals for each receiver from the frequency domain to a time domain to generate second inverse transformed return signals; and creating the contribution image frame from elements of the inverse transformed return signals. The method may also be wherein the transforming is performed using a fast Fourier transform and the inverse transforming is performed using an inverse fast Fourier transform. The method may also be wherein the number of virtual receivers is sufficient to ensure that the total number of receivers is greater than a width of the contribution image frame divided by a pixel width of an image frame. The method may also be wherein the number of virtual receivers is based on the sampling theorem. The method may also be wherein the emitted signal is a ground-penetrating radar signal that is emitted into the ground for detecting a buried explosive device. The method may also include creating a contribution image frame for each of a plurality of transmitters and generating a real aperture image from the created contribution image frames. The method may also be wherein the transmitters and receivers operate in a multistatic mode. The method may also include generating real aperture images from the contribution image frames transmitters at cross-track locations for a plurality of down-track locations and generating a synthetic aperture image for a target down-track location from the real aperture images of adjacent down-track locations.

A computing device for generating a contribution image frame for a transmitter based on return signals acquired by multiple receivers from a signal emitted by the transmitter at a down-track location is provided. The receivers are at cross-track locations. The computing device comprising a data store that stores a matrix of the return signals with each column representing a receiver and each row representing a fast time delay; a component that applies a fast Fourier transform first separately to each column of the matrix and then separately to each row of the transformed matrix to generate a row transformed matrix; a component that inserts columns of zeros into the row transformed matrix to account for under-sampling in a cross-track direction to generate a zero inserted matrix; a component that applies inverse fast Fourier transform first separately to each row of the zero inserted matrix and then separately to each column of the inverse transformed zero inserted matrix to generate an inverse column transformed zero inserted matrix; and a component that creates the contribution image frame from elements of the inverse column transformed zero inserted matrix. The computing device may also be wherein the number of columns of zeros inserted between each column of the row transformed matrix is sufficient to ensure that the total number of columns in the cross-track direction is greater than the width of the contribution image frame divided by a pixel width in an image frame. The computing device may also be wherein the emitted signal is a ground-penetrating radar signal that is emitted into the ground for detecting a buried explosive device. The computing device may also include a component that creates a contribution image frame for each of a plurality of transmitters at the down-track location and generating a real aperture image for the down-track location from the created contribution image frames. The computing device may also be wherein the transmitters and receivers operate in a multistatic mode and including a component that generates real aperture images for a plurality of down-track locations and a component that generates a synthetic aperture image for a target down-track location from the real aperture images of adjacent down-track locations.

Synthetic Aperture Integration Algorithm (SAI) for SAR Imaging

A method for generating a synthetic aperture radar image frame for a target down-track location from return signals acquired by receivers from signals emitted by transmitters at multiple down-track locations is provided. The return signal includes, for transmitter and receiver pairs, a number of samples indicating amplitude of the return signal. Each sample corresponds to a time at which the signal emitted by that transmitter was acquired by that receiver. The method comprises for each down-track location, for each transmitter, performing a plane-to-plane propagation of the return signals acquired by receivers from the signal emitted by that transmitter at that down-track location to generate a contribution image frame; and generating a contribution from that transmitter to the real aperture image for that down-track location using an aperture weighting function to generate a weighted sum of a component of that contribution from each receiver at that down-track location; and generating a real aperture image for that down-track location by summing the contributions from each transmitter; and summing the real aperture images for successive down-track locations into a synthetic aperture image for the target down-track location. The method may also be wherein the aperture weighting function is based on a distance from a receiver to a transmitter. The method may also be wherein the number of down-track locations that contribute to the synthetic aperture radar image frame is based on a height of a transmitter above a surface, a tilt angle of the transmitter relative to vertical, and a beam width of the transmitted signal. The method may also be wherein the emitted signals are emitted into a medium having a surface and the plane-to-plane propagation incorporates the refractive index of that medium. The method may also be wherein the transmitters and receivers operate in a multistatic mode. The method may also be wherein the emitted signals are emitted into a medium having a surface and including detecting an object below the surface of the medium from the synthetic aperture images generated for down-track locations. The method may also be wherein the object is an explosive device. The method may also be wherein the plane-to-plane propagation applies a fast Fourier transform to a time-reversed version of a return signal.

A computer-readable storage device storing computer-executable instructions for controlling a computing device to generate a synthetic aperture radar image frame for a target down-track location from return signals acquired by receivers from signals emitted by transmitters at multiple down-track locations is provided, the transmitters and receivers operating in a multistatic mode. The generating performed by a method comprising for each down-track location, for each transmitter, performing a plane-to-plane propagation of the return signals acquired by receivers from the signal emitted by that transmitter at that down-track location to generate a contribution image frame, wherein the plane-to-plane propagation applies a fast Fourier transform to a time-reversed version of a return signal; and generating a contribution from that transmitter to the real aperture image for that down-track location using an aperture weighting function to generate a weighted sum of a component of that contribution from each receiver at that down-track location; and generating a real aperture image for that down-track location by summing the contributions from each transmitter; and summing the real aperture images for successive down-track locations into a synthetic aperture image for the target down-track location. The method may also be wherein the aperture weighting function is based on a distance from a receiver to a transmitter. The method may also be wherein the number of down-track locations that contribute to the synthetic aperture radar image frame is based on a height of a transmitter above a surface, a tilt angle of the transmitter relative to vertical, and a beam width of the transmitted signal. The method may also be wherein the emitted signals are emitted into a medium having a surface and the plane-to-plane propagation incorporates the refractive index of that medium. The method may also be wherein the emitted signals are emitted into a medium having a surface and including detecting an object below the surface of the medium from the synthetic aperture images generated for down-track locations. The method may also be the object is an explosive device.

A computing device for generating a real aperture radar image for a down-track location from return signals acquired by receivers from signals emitted by transmitters at the down-track location is provided. The return signals include, for transmitter and receiver pairs, a number of samples indicating amplitude of the return signal. Each sample corresponds to a time at which the signal emitted by that transmitter was acquired by that receiver. The transmitters and receivers operate in multistatic mode. The computing device comprises a component that performs a plane-to-plane propagation of the return signals acquired by receivers from the signal emitted by a transmitter to generate a contribution image frame; a component that generates a contribution from each transmitter to the real aperture image using an aperture weighting function to generate a weighted sum of a component of that contribution from each receiver; and a component that generates a real aperture image for that down-track location by summing the contributions from each transmitter. The computing device may also include a component that sums the real aperture image for successive down-track locations into a synthetic aperture image for a down-track location. The computing device may also be wherein the aperture weighting function is based on a distance from a receiver to a transmitter. The computing device may also be wherein the number of down-track locations that contribute to the synthetic aperture radar image frame is based on a height of a transmitter above a surface, a tilt angle of the transmitter relative to vertical, and a beam width of the transmitted signal. The computing device may also be wherein the emitted signals are emitted into a medium having a surface and the plane-to-plane propagation incorporates the refractive index of that medium. The computing device may also be wherein the emitted signals are emitted into ground and including detecting a buried explosive from the synthetic aperture images generated for down-track locations.

Spatially Assisted Down-Track Median Filter for GPR Image Post-Processing

A method performed by a computing device for filtering a target image frame in an associated sequence of image frames along a down-track direction is provided. The target image frame has pixels with values. The method comprising for target pixels of the target image frame, calculating a median filtered value for the target pixel based on the value of corresponding pixels in each of the image frames in the associated sequence; and determining whether pixels in a neighborhood of the target pixel satisfy a filtering criterion based on values of the pixels in the neighborhood and their associated median filtered values; and after determining that the filtering criterion is satisfied, replacing the value of the target pixel with the calculated median filtered value. The method may also be wherein the determining includes calculating a difference between values of pixels of the target image frame in the neighborhood of the target pixel and their respective median-filtered values; and computing the minimum of the difference values within the neighborhood. The method may also be wherein the filtering criterion satisfied when a minimum of difference values within the neighborhood is greater than zero. The method may also be wherein the neighborhood is a rectangular area of pixels. The method may also be wherein the associated sequence of image frames is generated from return signals collected on a sequence of down-track locations in the vicinity of the target down-track location. The method may also be wherein the return signals are acquired by receivers from ground-penetrating radar signals emitted by transmitters, the transmitters and receivers operating in multistatic mode. The method may also be wherein the ground-penetrating radar signals are emitted into the ground and including determining whether an explosive device is buried based on analysis of a filtered target image frame.

A computer-readable storage device storing computer-executable instructions for controlling a computing device to filter a target image frame in an associated sequence of image frames along a down-track direction is provided. The target image frame has pixels with values. The target image frame is generated from the return signals acquired by receivers from ground-penetrating radar signals emitted by transmitters. The filtering is performed by a method comprising: calculating a median filtered value for a target pixel of the target image based on the value of corresponding pixels in the image frames in the associated sequence; determining whether pixels in a neighborhood of the target pixel satisfy a filtering criterion based on values of the pixels in the neighborhood and the median filtered values of the pixels in the neighborhood; and when the filtering criterion is determined to be satisfied, replacing the value of the target pixel with the calculated median filtered value. The method may also be wherein the determining includes calculating a difference between values of pixels of the target image frame in the neighborhood and median-filtered values of pixels of the target image frame in the neighborhood; and computing a minimum of the difference values within the neighborhood. The method may also be wherein the filtering criterion satisfied when a minimum of difference values within the neighborhood is greater than zero. The method may also be wherein the target image frame is represents a synthetic aperture image generated from real aperture images. The method may also be wherein the transmitters and receivers operate in multistatic mode. The method may also be wherein the ground-penetrating radar signals are emitted into the ground and including determining whether an explosive device is buried based on analysis of a filtered target image frame.

A computing device for filtering a target image frame in an associated sequence of image frames along a down-track direction is provided. The target image frame has pixels with values. The target image frame is generated from the return signals acquired by receivers from ground-penetrating radar signals emitted by transmitters. The transmitters and receivers operating in a multistatic mode. The computing device comprises a component that calculates a median filtered value for a pixel of the target image based on the value of corresponding pixels in the image frames in the associated sequence; a component that determines whether pixels in a neighborhood of a target pixel satisfy a filtering criterion based on values of the pixels in the neighborhood and the median filtered values of the pixels in the neighborhood; and a component that when replacing the value of the target pixel with a value derived from values of the pixels in the neighborhood when the criterion is satisfied. The computing device may also be wherein the component that calculates a difference between values of pixels of the target image frame in the neighborhood and median-filtered values of pixels of the target image frame in the neighborhood and computes a minimum of the difference values within the neighborhood. The computing device may also be wherein the filtering criterion satisfied when a minimum of difference values within the neighborhood is greater than zero. The computing device may also be wherein the replaced value for the target pixel in the target image frame is the calculated median filtered value for the target pixel. The computing device may also be wherein the transmitters and receivers operate in multistatic mode. The computing device may also be wherein the ground-penetrating radar signals are emitted into the ground and including determining whether an explosive device is buried based on analysis of a filtered target image frame. The computing device may also be wherein the target image frame represents a synthetic aperture image generated from real aperture images.

Spot Restoration for GPR Image Post-Processing

A method for restoring an original spot within a filtered image frame having pixels with values is provided. The filtered image frame has an original un-restored spot of pixels. The filtered image frame is generated by applying a filter to an image frame. The method comprises: identifying a restoration criterion based on the values of the pixels of the original spot; designating that the pixels of the original spot are within an enlarged spot and that pixels in a region adjacent to the original spot that satisfy the restoration criterion are also within the enlarged spot; and setting values of the pixels based on whether the pixels are in the restored spot. The method may also be wherein the restoration criterion is satisfied when the value of that pixel in the image frame prior to applying the filter is greater than a specified percentile of original spot pixel values in the image frame prior to filtering. The method may also be wherein the values of the pixels in the restored spot are restored to their un-attenuated values from the image frame prior to filtering. The method may also be wherein the value of the pixels not in the restored spot are set to zero. The method may also be wherein the image frame is generated from return signals acquired by receivers from signals emitted by transmitters. The method may also be wherein the signals are ground-penetrating radar signals emitted into the ground and including determining whether an explosive device is buried based on analysis of filtered image frame with the restored original spot. The method may also be wherein the transmitters and receivers operate in multistatic mode. The method may also be wherein the filtering includes noise/clutter filtering.

A computer-readable storage device storing computer-executable instructions for controlling a computing device to restore an original spot within a filtered image frame having pixels with values is provided. The restoring is performed by a method comprising: applying a filter to an image frame to generate the filtered image frame, the filtered image frame having an original un-restored spot of pixels; designating that the pixels of the original spot are within an enlarged spot and that pixels in a region adjacent to the original spot that satisfy restoration criterion are also within the enlarged spot; and setting values of the pixels based on whether the pixels are in the restored spot. The method may also be wherein the restoration criterion is satisfied when the value of a pixel in the image frame prior to applying the filter is greater than a specified percentile of original spot pixel values in the image frame prior to filtering. The method may also be wherein the values of the pixels in the restored spot are restored to their un-attenuated values from the image frame prior to filtering. The method may also be wherein the value of the pixels not in the restored spot is set to zero. The method may also be wherein the image frame is generated from return signals acquired by receivers from signals emitted by transmitters. The method may also be wherein the signals are ground-penetrating radar signals emitted into the ground and including determining whether an explosive device is buried based on analysis of filtered image frame with the restored original spot.

A computing device for restoring an original spot within a filtered image frame having pixels with values is provided. The image frame is generated from return signals acquired by receivers from signals emitted by transmitters. The computing device comprising a component that applies a filter to an image frame to generate the filtered image frame, the filtered image frame having an original un-restored spot of pixels; a component that designates that the pixels of the original spot are within an enlarged spot and that pixels in a region adjacent to the original spot that satisfy restoration criterion are also within the enlarged spot; and a component that sets values of the pixels in the enlarged spot to their values of the image frame prior to filtering and sets value of other pixels to zero. The computing device may also be wherein the restoration criterion is satisfied when the value of a pixel in the image frame prior to applying the filter is greater than a specified percentile of original spot pixel values in the image frame prior to filtering. The computing device may also be wherein the image frame is generated from return signals acquired by receivers from signals emitted by transmitters. The computing device may also be wherein the transmitters and receivers operate in a multistatic mode. The computing device may also be wherein the signals are ground-penetrating radar signals emitted into the ground and including determining whether an explosive device is buried based on analysis of filtered image frame with the restored original spot. The computing device may also be wherein the filter is a noise/clutter filter.

Buried Object Detection in GPR Images

A method for generating a statistic for a down-track location from an original reconstructed image frame and a post-processed image frame is provided. The image frames having pixels with values. The method comprises calculating energy of the pixels in the reconstructed image frame; calculating a spot energy from the values of post-processed image frame pixels within a spot; and setting the statistic based on a ratio of the spot energy to the pixel energy. The method may also be wherein the calculated energy of the pixels is the median of the values of the pixels in the original reconstructed image frame. The method may also be wherein the statistic is generated for each image frame in a sequence of image frames, peaks within the sequence are detected based on the generated statistic for each image frame, and subsurface object detection is based on the heights of those peaks. The method may also be wherein a spot is greater than a minimum area and less than a maximum area. The method may also be wherein the statistic is generated from each image frame in a sequence of image frames and the resulting statistics represents a times series of the statistic. The method may also be wherein each peak of sufficient height in the time series of statistics that is separated by a minimum number of statistics represents a subsurface object. The method may also be wherein the statistic is generated for each image frame in a sequence of image frames and the statistic is instantaneously self-detrending. The method may also be wherein a sequence of image frames is generated from return signals collected at a sequence of down-track locations from return signals acquired by receivers from ground-penetrating radar signals emitted by transmitters, the transmitters and receivers operating in a multistatic mode. The method may also be wherein the ground-penetrating radar signals are emitted into the ground and including determining whether an explosive device is buried based on analysis of statistics for the sequence of image frames.

A computer-readable storage device storing computer-executable instructions for controlling a computing device to detect an object within a sequence of image frames generated for down-track locations is provided. Each down-track location has a reconstructed image frame and post-processed image frame. The detecting is performed by a method comprising: for each down-track location, calculating energy of pixels in the reconstructed image frame for the down-track location; calculating a spot energy from pixels of the post-processed image frame of the down-track location that are within a spot on the post-processed image frame; and setting a statistic for the down-track location based on a ratio of the spot energy to the pixel energy; and detecting presence of an object within the sequence of image frames based on a peak in the statistic for the down-track locations. The method may also be wherein the calculated energy of the pixels is the median of the values of the pixels in the original reconstructed image frame. The method may also be wherein a spot is greater than a minimum area and less than a maximum area. The method may also be wherein an object is detected as present for each peak of sufficient height that is separated by a minimum number of down-track locations. The method may also be wherein the statistic is instantaneously self-detrending. The method may also be wherein a sequence of image frames is generated from return signals collected at the down-track locations by receivers from ground-penetrating radar signals emitted by transmitters.

A computing device for generating a statistic for a down-track location from a reconstructed image frame and a post-processed image frame is provided. The image frames is generated from return signals acquired at the down-track location by receivers from ground-penetrating radar signals emitted by transmitters. The transmitters and receivers operate in a multistatic mode. The computing device comprising a component that calculates energy of pixels in the reconstructed image frame; a component that calculates a spot energy from the values of post-processed image frame pixels within a spot; and a component that sets the statistic for the down-track location based on a ratio of the spot energy to the pixel energy, the statistic for determining whether an object is buried in the ground. The computing device may also be wherein the calculated energy of the pixels is the median of the values of the pixels in the original reconstructed image frame. The computing device may also be wherein the statistic is generated for each image frame in a sequence of image frames, peaks within the sequence are detected based on the generated statistic for each image frame, and buried object detection is based on the heights of those peaks. The computing device may also be wherein a peak of sufficient height in the statistics that is separated by a minimum number of statistics represents a buried object. The computing device may also be wherein the buried object is an explosive device.

DETAILED DESCRIPTION

A method and system for detecting the presence of subsurface objects within a medium is provided. In some embodiments, the imaging and detection system operates in a multistatic mode by using radar return signals associated with every possible transmitter/receiver pair within an array of transmitter and receiver antennas. For example, when the imaging and detection system is used on a roadway (or more generally a track), the array of transceiver antenna pairs may be mounted on a vehicle that travels down the roadway. Each transceiver antenna pair is associated with a location across the roadway, and the transceiver antenna pairs transmit signals and receive return signals at the various sampling locations down the roadway. The imaging and detection system pre-processes return signals to suppress the effects of extraneous signals such as antenna coupling, external interference, surface bounce and multipath, surface roughness, and so on. After preprocessing the return signals, the imaging and detection system generates reconstructed images for the sampling locations. The reconstructed images represent an image of the subsurface that extends across the medium for the length of the array of transceiver antenna pairs and to a certain depth. To generate the reconstructed images, the imaging and detection system generates a real aperture radar tomography image for each sampling location using plane-to-plane backward propagation. The imaging and detection system then generates a synthetic aperture radar image representing the reconstructed image for a sampling location based on a sequence of real aperture radar images at nearby sampling locations. The imaging and detection system then post-processes the reconstructed images to assist in improving the detection of objects. The imaging and detection system may subtract out various mean values from the pixel values of the reconstructed images, apply various filters, and enhance the energy of a spot within the reconstructed images. The imaging and detection system generates a detection statistic for each pre-processed image. For example, the detection statistic may be based on the total energy of the dominant spot within a post-processed image. The imaging and detection system considers the detection statistic as a time-varying signal with an amplitude corresponding to the time of each sampling. The peaks within the detection statistic indicate a subsurface object. The imaging and detection system then applies a peak filtering detection algorithm within the detection statistics to identify the presence of a subsurface object. Although the imaging and detection system is described primarily for processing ground-penetrating radar data to detect buried objects (e.g., landmines, pipes, and rocks), the imaging and detection system has many other applications, such as in the civil engineering and medical fields, and may use signals other than electromagnetic signals, such as acoustic signals.

Figure 1:
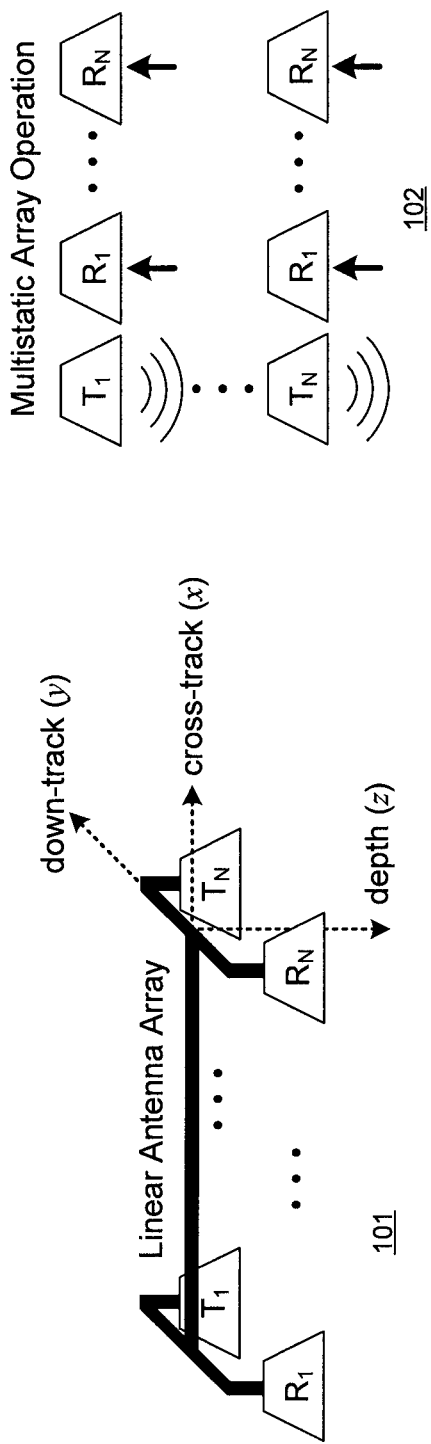
FIG. 1 is a diagram that illustrates an arrangement of a linear array of antennas.

In some embodiments, the imaging and detection system employs a linear array of transmitter and receiver antennas for transmitting and receiving radar signals. For example, the linear array may consist of 16 transmitters $T_i$ and 16 receivers $R_j$ with each transmitter $T_k$ and receiver $R_k$ organized into a transceiver pair. The transceivers are equally spaced across the linear array. FIG. 1 is a diagram that illustrates an arrangement of a linear array of antennas. The linear array may be moved across a stationary surface or may be stationary with the surface moving. For example, the linear array may be mounted on a vehicle that is driven on a road to detect buried objects or may be a stationary part of a medical device in which a patient is moved under the linear array. The linear array moves in a down-track (or y) direction relative to the surface, the linear array is oriented in a cross-track (or x) direction, and the linear array transmits signals in the depth (or z) direction. For example, when a linear array is mounted on a vehicle traveling on a road, the down-track is the direction of travel, the cross-track is the direction across the road, and the depth is the direction into the road. As shown in the linear array 101, the transmitter and receiver $T_iR_i$ associated with a given transceiver pair are located at substantially the same cross-track location. The linear array has two modes of operation: multi-monostatic and multistatic. In monostatic mode, the signal transmitted by a transmitter is received only by the receiver of that same transceiver. The multi-monostatic mode refers to the operation of multiple transceivers of a linear array that each operate in the monostatic mode in sequence. When in multi-monostatic mode, at each down-track or sampling location, the imaging and detection system activates the transmitters of each transceiver in sequence across the track and collects the return signal only at the corresponding receiver of that transceiver. The imaging and detection system thus collects one return signal for each transceiver at each down-track location. The multistatic mode refers to the operation of multiple transceivers of a linear array in which each transmitter transmits in sequence, but the return signal is collected by multiple receivers, generally all the receivers. When in multistatic mode, at each down-track location, the imaging and detection system activates the transmitter of each transceiver in sequence and collects the return signal from all the receivers as illustrated in diagram 102. If the linear array has N transceivers, then the imaging and detection system collects N return signals in multi-monostatic mode and $N^2$ return signals in multistatic mode. In some embodiments, the array of transceivers may not be linear or may be organized into a grid of transceivers.

Figure 2:
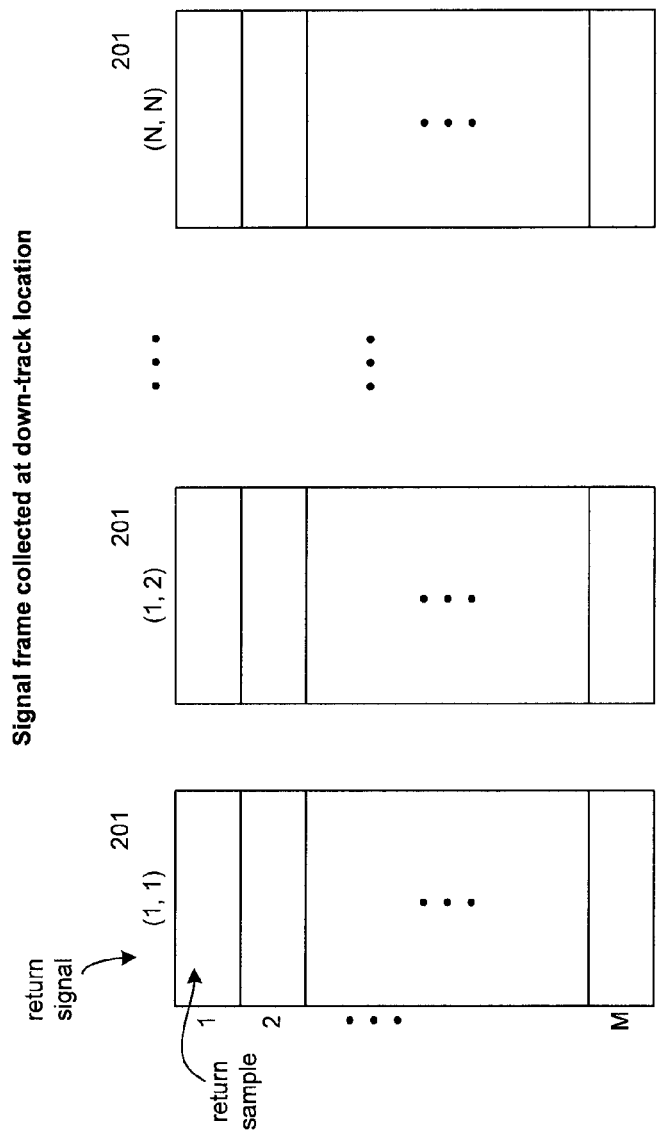
FIG. 2 is a diagram that illustrates data structures storing the return signals collected by the imaging and detection system when in multistatic mode in some embodiments.

FIG. 2 is a diagram that illustrates data structures storing the return signals collected by the imaging and detection system when in multistatic mode in some embodiments. The data structures 201 store the quantized return signals. In operation, each transmitter transmits by sending a transmit signal and each receiver acquires a return signal. The receivers operate at a sampling rate and collect M return samples of the return signal per transmit signal. Each sample has a value of the amplitude of the return signal at the associated time it took for the transmitted signal to be reflected back to a receiver, so earlier collected samples may indicate reflection from the surface and later collected samples may indicate reflection off some subsurface object. The time between the transmitting of the signal and the collection of a return sample is referred to as a "fast time delay." When in multistatic mode and the return signal is collected from each of the N receivers, the imaging and detection system collects $M \times N^2$ samples for each down-track location as indicated by diagram 200. The return signals collected at each down-track location are referred to as a signal frame.

Figure 3:
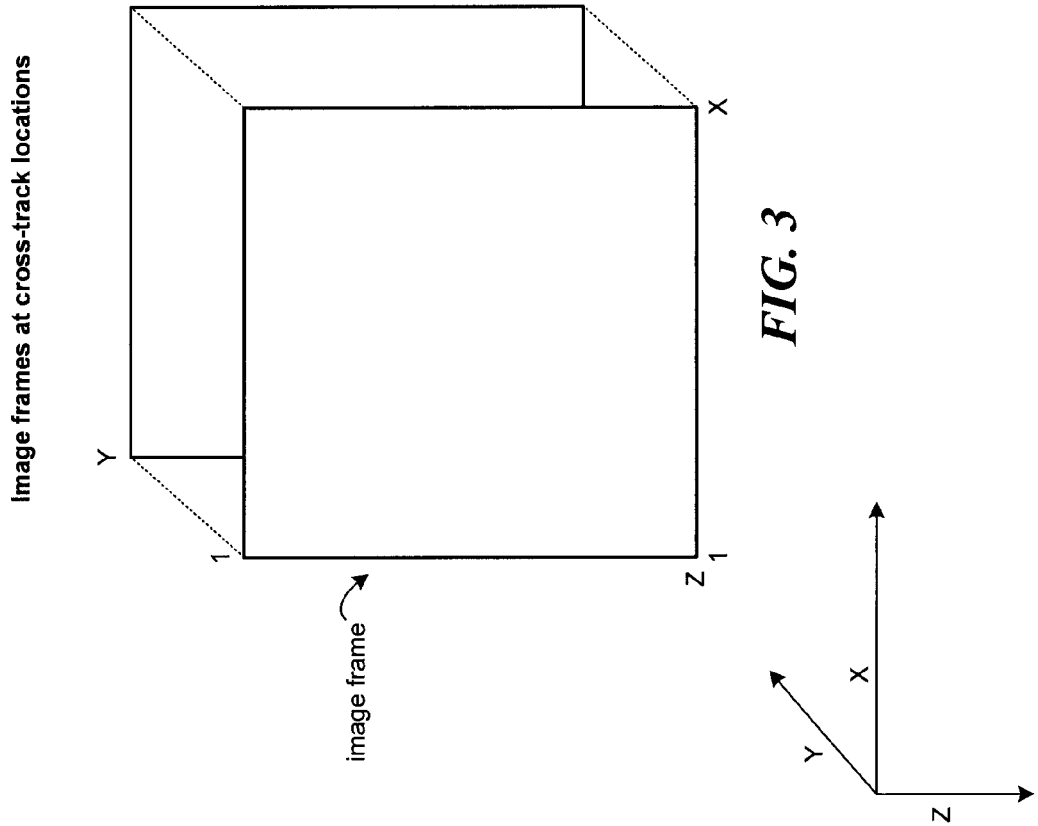
FIG. 3 is a diagram that illustrates a data structure storing the image frames generated from the return signals by the imaging and detection system in some embodiments.

FIG. 3 is a diagram that illustrates a data structure storing the image frames generated from the return signals by the imaging and detection system in some embodiments. The imaging and detection system generates an image frame of pixels for each down-track location that represents a subsurface image at that down-track (or y) location that spans across the track and down to a certain depth. Each image frame thus represents an image that is the width of the track down to a prescribed depth. Each column of an image frame represents a certain cross-track location, and each row of the image frame represents a certain depth. The cross-track width divided by the number of columns X represents the cross-track resolution $\Delta_x$ of the image frame, and the prescribed depth divided by the number of rows Z represents the depth resolution $\Delta_z$ of the image frame. The imaging and detection system thus represents each image by $X \times Z$ pixels. Each image is represented as an image frame, and the value of each pixel represents the energy associated with the subsurface point at the cross-track location and depth of the pixel at the down-track location of the image frame.

Figure 4:
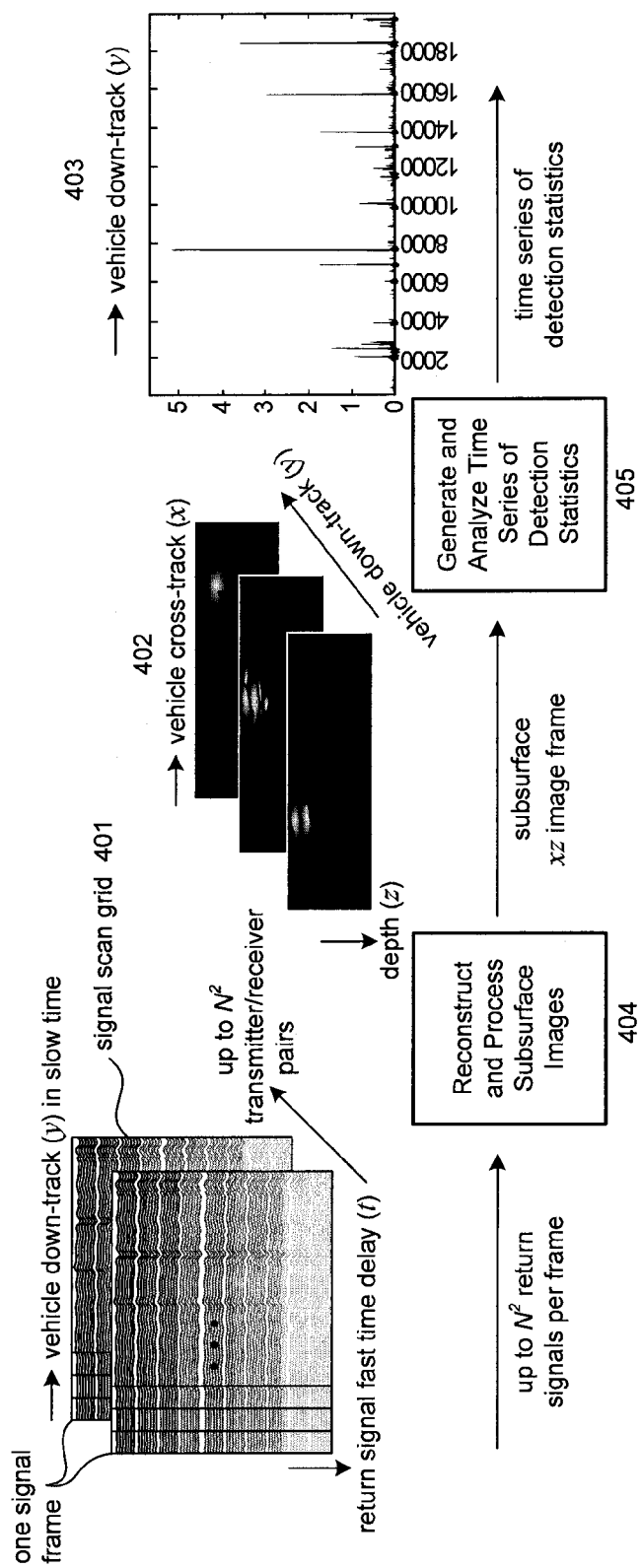
FIG. 4 is a diagram illustrating the overall processing of the imaging and detection system in some embodiments.

FIG. 4 is a diagram illustrating the overall processing of the imaging and detection system in some embodiments. Signal scan grid 401 represents the samples collected by the imaging and detection system at the down-track locations. The signal scan grid has a plane for each transmitter and receiver pair, and the planes have a column for each down-track location and a row for each sample (or fast time delay). Each column represents a return signal. A down-track signal scan is thus a sequence of return signals (a 2D array in which each column is a return signal acquired in sequence down-track), and there is one down-track signal scan for each transmitter and receiver pair. Conceptually, a subsurface object that is a point is represented by a hyperbolic arc across a signal scan. When the linear array approaches that subsurface object, the return signal from that subsurface object initially appears at a relatively long fast time delay, but the fast time delay for the corresponding return signal decreases as the linear array gets closer and increases as the linear array then gets farther away, forming a hyperbolic arc across the signal scan. A reconstruct and process subsurface images function 404 inputs the signal scans and generates the image frames 402 at the various down-track locations. An area of high energy (with pixels of high value) in an image frame indicates the presence of a subsurface object. A "generate and analyze time series of detection statistics" function 405 inputs the image frames and generates detection statistics as represented by a time-series graph 403. The imaging and detection system generates a detection statistic value for each down-track location such that a high detection statistic value tends to indicate that the subsurface object is present at that down-track location. The time-series graph plots the detection statistic value for each down-track location. The peaks in the time-series graph tend to indicate the presence of a subsurface object.

Signal Pre-Processing

The imaging and detection system pre-processes the return signals to suppress various artifacts such as those resulting from antenna coupling, external interference, surface bounce and multipath, and surface roughness. Antenna coupling is caused by transmitted signals that repeatedly bounce off nearby metal antennas. The antenna coupling is characterized by large amplitude return signals at certain fast time delays that produce "streaks" in the return signals across the down-track locations. The effects of antenna coupling can be mitigated by packing radar absorption material around the antennas. The imaging and detection system also suppresses the effects of antenna coupling computationally by subtracting out a short duration median of the samples across the down-track location for each fast time delay. The imaging and detection system suppresses external interference (e.g., caused by communication transmissions) by applying a very short duration median filter to the samples across the track locations for each fast time delay.

The imaging and detection system employs a recursive mean update ("RMU") algorithm to cancel the effects of extraneous signals in the return signals. When a GPR signal from a transmitter arrives at the surface, part of the signal refracts into the medium and part of the signal reflects off the surface. The part of the signal that reflects off the surface is referred to as surface bounce. When a surface bounce reaches an antenna, a portion of the surface bounce returns to the antenna array and is reflected back to the surface creating a multipath effect. The process continues until the surface bounces attenuate. These surface bounces are referred to as the primary surface bounce, secondary surface bounce, and so on.

For each transmitter and receiver pair, the RMU algorithm considers return signals in groups for which the time delay $\Delta_t$ from transmitter to potentially uneven ground surface to receiver (the air gap) are all virtually equal. The RMU algorithm estimates the background for each return signal as a weighted average of previously acquired gain-bias adjusted versions of return signals that belong to the same group (i.e., that have the same transmitter and receiver pair and air gap). The RMU algorithm updates the background estimate by adding an adaptively weighted version of the gain-bias adjusted version of the previous return signal to an adaptively weighted version of the previous background estimate. The adaptation parameter is based on the disparity between the previous background estimate and the gain-bias adjusted version of the previous return signal.

The RMU algorithm models the $k^{th}$ return signal transmitted by $T_i$ and received by $R_j$ from the designated group by the following equation:

$$g(k) = s(k) + b(k) \quad (1)$$

where $g(k) = \{g_l(k)\}_{l=0}^{M-1}$ represents a return signal with M samples, $s(k)$ represents the signal of interest or the foreground component, and $b(k)$ represents the rest of the return signal or background component (attributed to surface bounce, clutter, noise, and so on). The RMU algorithm estimates $s(k)$ by the following equation:

$$\hat{s}(k) = g(k) - \hat{b}(k) \quad (2)$$

where $\hat{s}(k)$ and $\hat{b}(k)$ are estimates of $s(k)$ and $b(k)$, respectively. The RMU algorithm estimates the background of the return signal by the following equation:

$$\hat{b}(k) = \begin{cases} g(0) & k = 0 \\ [1 - \alpha(k)]\hat{b}(k-1) + \alpha(k)\tilde{g}(k-1) & k > 0 \end{cases} \quad (3)$$

where $\hat{b}(k)$ represents the estimated background signal for $g(k)$, $\tilde{g}(k)$ represents a gain-bias adjusted version of $g(k)$, and $\alpha(k)$ represents an adaptation parameter. The adaptation parameter is a value between 0 and 1 that quantifies summation weights for the updated background estimate. The RMU algorithm represents the gain-bias adjusted version of $g(k)$ by the following equation:

$$\tilde{g}(k) = [\, g(k) \quad 1\,] \begin{bmatrix} A_0(k) \\ A_1(k) \end{bmatrix} \quad (4)$$

where $\tilde{g}(k)$ represents $g(k)$ with an optimal least-squares gain and bias and $A_0$ and $A_1$ are represented by the following equation:

$$\begin{bmatrix} A_0(k) \\ A_1(k) \end{bmatrix} = \begin{bmatrix} 1 \\ 0 \end{bmatrix} (k = 0), \quad (5)$$

$$\begin{bmatrix} [\hat{b}^T(k-1)g(k) - M\mu_{\hat{b}}(k-1)\mu_g(k)]/\|g(k)\|^2 \\ [\mu_{\hat{b}}(k-1)\|g(k)\|^2 - \hat{b}^T(k-1)g(k)\mu_g(k)]/\|g(k)\|^2 \end{bmatrix} (k > 0)$$

where $\mu_x(k)$ represents the mean of signal x, $\|g(k)\|$ represents the Euclidean length of the vector represented by $g(k)$, and M is the number of samples in $g(k)$. Each element of $\tilde{g}(k)$ is thus the corresponding element of $g(k)$ times $A_0$ plus $A_1$. The RMU signal represents the adaptation parameter by the following equation:

$$\alpha(k) = \alpha_0 \exp\!\left(1 - \frac{\max[d(k), \mu_d(k) + \sigma_d(k)]}{\mu_d(k) + \sigma_d(k)}\right) \in [0, \alpha_0] \quad (6)$$

where $\alpha_0$ is between 0 and 1, $d(k)$ represents the disparity between $\tilde{g}(k-1)$ and $\hat{b}(k-1)$, $\mu_d(k)$ represents the mean of the disparities through the current down-track location, and $\sigma_d(k)$ represents the standard deviation of the disparities through the current down-track location. The RMU algorithm represents the disparity by the following equation:

$$d(k) = \begin{cases} 0 & k = 0 \\ \sum_{i=0}^{M-1} \max[\tilde{g}_i(k-1) - \hat{b}_i(k-1), 0] & k > 0 \end{cases} \quad (7)$$

The RMU algorithm has the following characteristics. At each down-track location, the complexity of the RMU algorithm is O(M). The RMU algorithm is stable in that it does not use matrix inversion and is optimal in the sense that it compares background estimated signals to optimally gain-bias adjusted signals. The RMU algorithm is spatially adaptive in that it recursively adjusts the background estimate to varying surface bounce and multipath over time. The RMU algorithm also suppresses anomalous signals to prevent corruption of the background estimates.

The imaging and detection system then removes the effects of surface roughness by effectively flattening out the surface by shifting each column such that the first row of each scan occurs at the surface. The resulting signal scan is the preprocessed signal scan.

Imaging

The imaging and detection system generates a synthetic aperture radar ("SAR") image for each down-track location from a sequence of adjacent real aperture radar images represented by real aperture radar ("RAR") image frames at nearby adjacent down-track locations. The adjacent down-track locations typically include a range of locations slightly before and possibly slightly after the target down-track location for which the synthetic aperture radar image frame is being generated. At each down-track location, the imaging and detection system generates a RAR image frame by summing contributions for each of N transmitters. The contribution from each transmitter is reconstructed by applying plane-to-plane propagation either to all of the associated N received signals or to only some subset of those received signals. The imaging and detection system then generates the synthetic aperture radar image frame by combining associated real aperture radar image frames for adjacent down-track locations.

Figure 5:
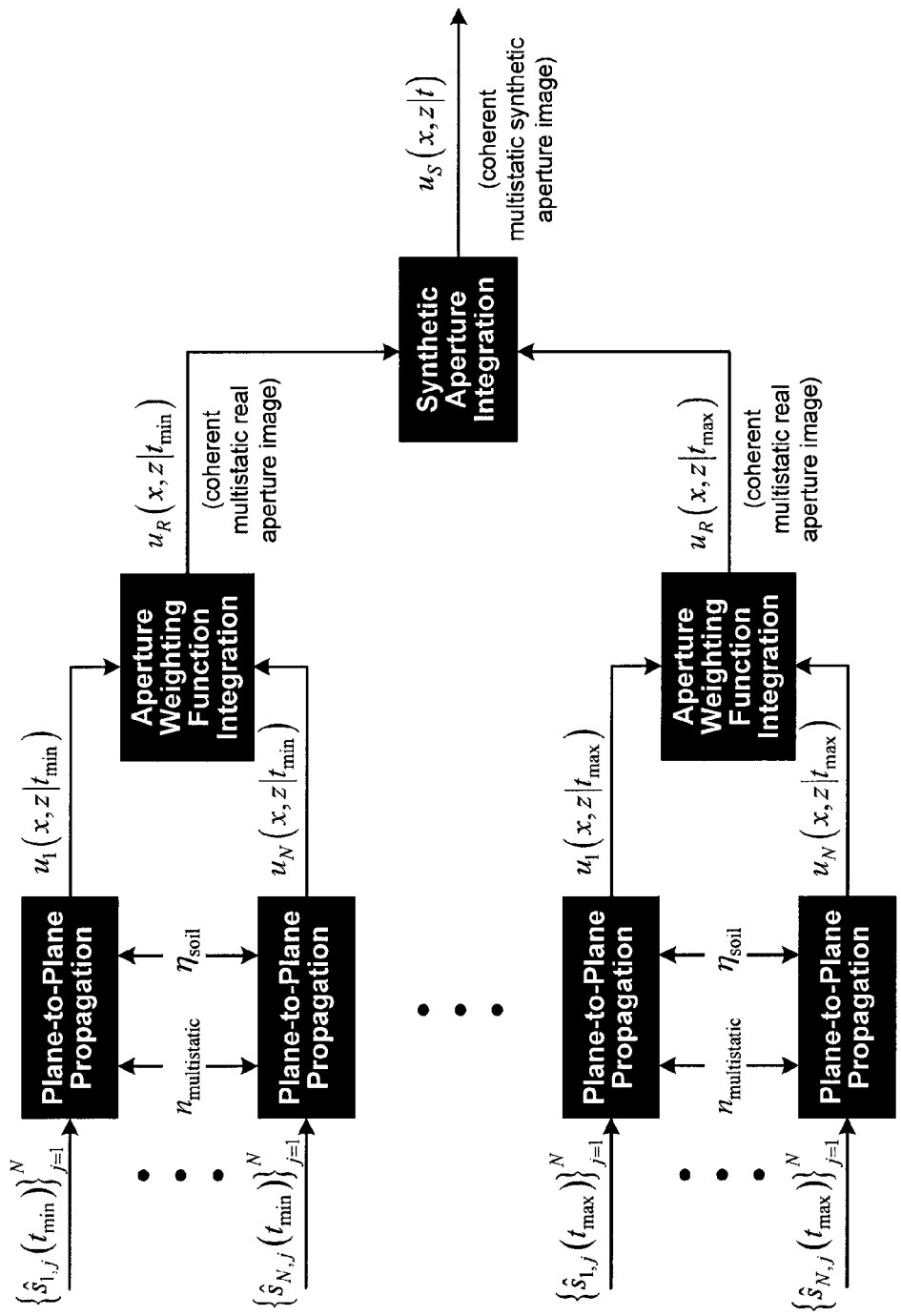
FIG. 5 is a block diagram that illustrates the generation of a synthetic aperture image.

The imaging and detection system generates a synthetic aperture image frame for each down-track location from a sequence of real aperture images generated within a synthetic aperture window that contains some number of down-track locations before and possibly after each target down-track location. The imaging and detection system employs a synthetic aperture integration ("SAI") algorithm that is computationally efficient. FIG. 5 is a block diagram that illustrates the generation of a synthetic aperture image. For each down-track travel time t, the SAI algorithm initially forms a RAR image by summing image frames $\{u_i(x,z)\}_{i=1}^{N}$ contributed by each transmitter $\{T_i\}_{i=1}^N$. Each contributed image $\{u_i(x,z)\}$ is reconstructed by applying plane-to-plane propagation to the return signals $\{s_{i,j}\}_{j=1}^N$ from transmitter $T_i$ acquired by receivers $R_j$. For example, the imaging and detection system may use a plane-to-plane propagation technique as described in Mast, J. and Johansson, E., "Three-Dimensional Ground Penetrating Radar Imaging Using Multi-Frequency Diffraction Tomography," Proceedings of the International Symposium on Optics (SPIE), 2275, 196, July 1994, which is hereby incorporated by reference. When forming the RAR image frame contribution associated with transmitter $T_i$, the SAI algorithm uses an aperture weighting function to weight contributions from each receiver based on the distance $T_i$ to that receiver. The SAI algorithm then combines the real aperture image frames for each down-track location within the synthetic aperture window into synthetic aperture image frame $u_S(x,z)$ for that down-track location.

The SAI algorithm represents the synthetic aperture image frame by the following equation:

$$u_S(x, z | t_{k_0}) = \sum_{k=k_{min}(k_0)}^{k_{max}(k_0)} u_R(x, z'(t_k | z) | t_k) \tag{8}$$

where $u_S(x,z|t_{k_0})$ represents the synthetic aperture image frame at target down-track location $k_0$, $\{u_R(x,z|t_k)\}$ represents the real aperture image frame at down-track location $k$, $z'(t_k|z)$ represents the depth of a pixel of the real aperture image frame that contributes to the pixel of the synthetic aperture image frame, and $k_{min}(k_0) \le k_0 \le k_{max}(k_0)$ such that $k_{min}$ is the starting down-track location and $k_{max}$ is the ending down-track location in the synthetic aperture window. The SAI algorithm may determine the number of real aperture radar image frames before and after the target down-track location that are in the synthetic aperture window based on down-track locations whose return signals likely include a contribution of a point at the target down-track location factoring in the height above the surface of the antenna array, the forward tilt angle of the antenna bore sight axis from the vertical, and the beam width of the transmitted signal. The SAI algorithm uses the depth of the pixel that contributes to the synthetic aperture image frame so that the depth satisfies the following equation:

$$\text{delay}[(y_k,h) \text{ to } (y_{k_0}+h \tan \phi, z)] = \text{delay}[(y_k,h) \text{ to } (y_k+h \tan \phi, z'(t_k|z))] \tag{9}$$

where h represents the height of the antenna array above the surface, $\phi$ represents the forward tilt angle of the antenna array from vertical, and delay(A to B) represents the time delay of radar wave propagation from point A to point B (through the above surface medium (e.g., air) and then through the subsurface medium (e.g., soil)).

The SAI algorithm combines the contribution image frame generated by the plane-to-plane propagation for each transmitter into the real aperture image frame for that down-track location. The SAI algorithm weights the contribution of each transmitter to a pixel based on the difference between the cross-track location of the transmitter and the cross-track location of the pixel as represented by the following equation:

$$u(x, z) = \sum_{i=1}^{N} w(i\Delta_x - x) u_i(x, z) \tag{10}$$

where w represents the aperture weighting function, $\Delta_x$ represents the distance between receivers, and i represents the $i^{th}$ transmitter. The weighting function is a non-negative function that integrates to 1 and, in some embodiments, is a symmetrical unimodal function with a peak at x=0 that decreases or remains constant (as for a rectangular pulse) as |x| increases.

In some embodiments, the SAI algorithm factors into the generation of the synthetic aperture image frames the speed and direction of propagation of the signal through the air and the medium. The imaging and detection system estimates the refractive index of the medium by the following equation:

$$\eta_{soil} = \eta_{soil}(\lambda) \approx \sqrt{\overline{\in_{soil}(\lambda)}} > 1 \tag{11}$$

where $\eta_{soil}$ represents the refractive index and $\in_{soil}(\lambda)$ represents the permittivity at wavelength $\lambda$. The imaging and detection system may apply a manual focusing technique to estimate the refractive index. The imaging and detection system collects signals for a known object below the surface and then varies the refractive index until a person deems that the object is in focus.

The imaging and detection system reconstructs images at a specific computed pixel resolution avoid aliasing corruption in the real aperture images. The imaging and detection system represents the width and height of the pixels of the images by the following equations:

$$\Delta_x < c/(2f_{max}) \tag{12}$$

$$\Delta_z = c/(\eta_{soil} f_{max}) \tag{13}$$

where $\Delta_x$ represents the width of a pixel, $\Delta_z$ represents the height of a pixel, and $f_{max}$ represents the maximum frequency of the band-pass filtered signal (e.g., 4 GHz for GPR). The height of the pixel is derived from Snell's law based on the depth resolution limit, and the width of the pixel is derived from the sampling theorem to avoid aliasing.

The imaging and detection system efficiently performs the plane-to-plane propagation by applying the fast Fourier transform to a time-reversed version of the return signal. The imaging and detection system represents the return signals for the transmitters at each down-track location as a set of two-dimensional arrays $\{g(t,x)\}$ with a column for each receiver $R_x$ and a row for each fast time delay t. The imaging and detection system applies the fast Fourier transform separately to each column of the array, resulting in $\{G_t(f_t,x)\}$. The imaging and detection system then applies a band-pass filter separately to each column of each two-dimensional array. The imaging and detection system finally applies a the fast Fourier transform to each row of each two-dimensional array, resulting in $\{G_{tx}(f_t,f_x)\}$. The real aperture radar images are aliased if the receivers are under-sampled at the highest band-pass frequency, that is, if the number of receivers is less than the track width divided by the pixel width $\Delta_x$ of Equation 12. To prevent aliasing, the imaging and detection system uses a zero source insertion technique in which virtual receivers that emit no time-reversed signal are inserted between the real receivers. The imaging and detection system inserts columns of zeros into $\{G_{tx}(f_t,f_x)\}$ (such that the number of columns is not less than the track width divided by the pixel width $\Delta_x$) before applying an inverse fast Fourier transform separately to each row. The reconstructed RAR image is obtained as the magnitude of this inverse Fourier transform (the pixels are all non-negative).

Imaging with Spatially Adaptive Migration

The presence of a subsurface object may only be detectible in return signals for transmitter and receiver pairs closest to the object. When the real aperture image frame is generated from all the return signals, the values of the pixels for the object may be diluted because of the influence of the return signals in which the object is not detectible. In some embodiments, the imaging and detection system mitigates dilution by generating a value for each pixel of the real aperture image from a subset of the multistatic return signals. The imaging and detection system may limit the contribution of return signals to each pixel to transmitter and receiver pairs that are closest to the pixel. The detection system represents the subset of transmitter and receiver pairs that contribute to a pixel by the following equation:

$$\omega_{MDSM(x)} = \{(i,j): \max(i_x-n,1) \le i,j \le \min(i_x+n,N)\} \quad (14)$$

where $\omega_{MDSM(x)}$ represents the set of transmitter and receiver pairs that will contribute to pixels in column x, i represents a transmitter, j represents a receiver, n represents a multistatic degree, N represents the number of transceivers, and $i_x$ represents the index of the transceiver that is closest to column x. This index is represented by the following equation:

$$i_x = \text{round}(x\Delta_x/\Delta_A) \quad (15)$$

where $\Delta_x$ represents the pixel width and $\Delta_A$ represents the cross-track distance between receivers. The multistatic degree specifies the number of nearest adjacent transmitters and receivers on either side of the transmitter closest to a particular column of the image that contribute to value of pixels of that column. For example, when the multistatic degree is 1, then only the closest transmitter and receiver to either side will contribute to the pixels in that column, resulting in a total of no more than nine pairs of contributing transmitters and receivers. The number n(x) of transmitter and receiver pairs that contribute to pixels of a column is represented by the following inequality:

$$n(x) \le (2n+1)^2 \quad (16)$$

Table 1 illustrates the transmitter and receiver pairs that contribute to the columns that are closest to each transceiver $T_iR_i$ when there are 6 transceivers and the multistatic degree is 1.

TABLE 1

(a)
|       | $R_1$ | $R_2$ | $R_3$ | $R_4$ | $R_5$ | $R_6$ |
|-------|---|---|---|---|---|---|
| $T_1$ | 1 | 1 | 0 | 0 | 0 | 0 |
| $T_2$ | 1 | 1 | 0 | 0 | 0 | 0 |
| $T_3$ | 0 | 0 | 0 | 0 | 0 | 0 |
| $T_4$ | 0 | 0 | 0 | 0 | 0 | 0 |
| $T_5$ | 0 | 0 | 0 | 0 | 0 | 0 |
| $T_6$ | 0 | 0 | 0 | 0 | 0 | 0 |

(b)
|       | $R_1$ | $R_2$ | $R_3$ | $R_4$ | $R_5$ | $R_6$ |
|-------|---|---|---|---|---|---|
| $T_1$ | 1 | 1 | 1 | 0 | 0 | 0 |
| $T_2$ | 1 | 1 | 1 | 0 | 0 | 0 |
| $T_3$ | 1 | 1 | 1 | 0 | 0 | 0 |
| $T_4$ | 0 | 0 | 0 | 0 | 0 | 0 |
| $T_5$ | 0 | 0 | 0 | 0 | 0 | 0 |
| $T_6$ | 0 | 0 | 0 | 0 | 0 | 0 |

(c)
|       | $R_1$ | $R_2$ | $R_3$ | $R_4$ | $R_5$ | $R_6$ |
|-------|---|---|---|---|---|---|
| $T_1$ | 0 | 0 | 0 | 0 | 0 | 0 |
| $T_2$ | 0 | 1 | 1 | 1 | 0 | 0 |
| $T_3$ | 0 | 1 | 1 | 1 | 0 | 0 |
| $T_4$ | 0 | 1 | 1 | 1 | 0 | 0 |
| $T_5$ | 0 | 0 | 0 | 0 | 0 | 0 |
| $T_6$ | 0 | 0 | 0 | 0 | 0 | 0 |

TABLE 1-continued (d)
|       | $R_1$ | $R_2$ | $R_3$ | $R_4$ | $R_5$ | $R_6$ |
|-------|---|---|---|---|---|---|
| $T_1$ | 0 | 0 | 0 | 0 | 0 | 0 |
| $T_2$ | 0 | 0 | 0 | 0 | 0 | 0 |
| $T_3$ | 0 | 0 | 1 | 1 | 1 | 0 |
| $T_4$ | 0 | 0 | 1 | 1 | 1 | 0 |
| $T_5$ | 0 | 0 | 1 | 1 | 1 | 0 |
| $T_6$ | 0 | 0 | 0 | 0 | 0 | 0 |

(e)
|       | $R_1$ | $R_2$ | $R_3$ | $R_4$ | $R_5$ | $R_6$ |
|-------|---|---|---|---|---|---|
| $T_1$ | 0 | 0 | 0 | 0 | 0 | 0 |
| $T_2$ | 0 | 0 | 0 | 0 | 0 | 0 |
| $T_3$ | 0 | 0 | 0 | 0 | 0 | 0 |
| $T_4$ | 0 | 0 | 0 | 1 | 1 | 1 |
| $T_5$ | 0 | 0 | 0 | 1 | 1 | 1 |
| $T_6$ | 0 | 0 | 0 | 1 | 1 | 1 |

(f)
|       | $R_1$ | $R_2$ | $R_3$ | $R_4$ | $R_5$ | $R_6$ |
|-------|---|---|---|---|---|---|
| $T_1$ | 0 | 0 | 0 | 0 | 0 | 0 |
| $T_2$ | 0 | 0 | 0 | 0 | 0 | 0 |
| $T_3$ | 0 | 0 | 0 | 0 | 0 | 0 |
| $T_4$ | 0 | 0 | 0 | 0 | 0 | 0 |
| $T_5$ | 0 | 0 | 0 | 0 | 1 | 1 |
| $T_6$ | 0 | 0 | 0 | 0 | 1 | 1 |

As shown in Table 1(b), when transceiver $T_2R_2$ is closest to a column, then transmitter and receiver pairs $T_1R_1$, $T_1R_2$, $T_1R_3$, $T_2R_1$, $T_2R_2$, $T_2R_3$, $T_3R_1$, $T_3R_2$, and $T_3R_3$ contribute to the pixels in that column. As illustrated by Tables 1(a) and 1(f), the columns near the ends of the image frame have fewer than $(2n+1)^2$ transmitter and receiver pairs that contribute to those columns.

The imaging and detection system may also dynamically identify weights of the transmitter and receiver pairs for their contribution of sample values to a pixel of a specific column of the real aperture image frame. The imaging and detection system weights signal samples based on the statistical significance of the samples such that less statistically significant samples are weighted less than more statistically significant samples. The imaging and detection system determines statistical significance of a sample by comparing the samples that contribute to the pixels in a row to the mean and standard deviation of all those contributing samples from previous down-track locations. The imaging and detection system may dynamically identify the transmitter and receiver pairs that contribute to each column based on the dynamically identified weights. The imaging and detection system may calculate the weights for all receiver and transmitter pairs (or pairs within the multistatic degree) and then discard the information for those transmitter and receiver pairs with a very low weight to effect the dynamic identification to improve image quality.

Figure 6:
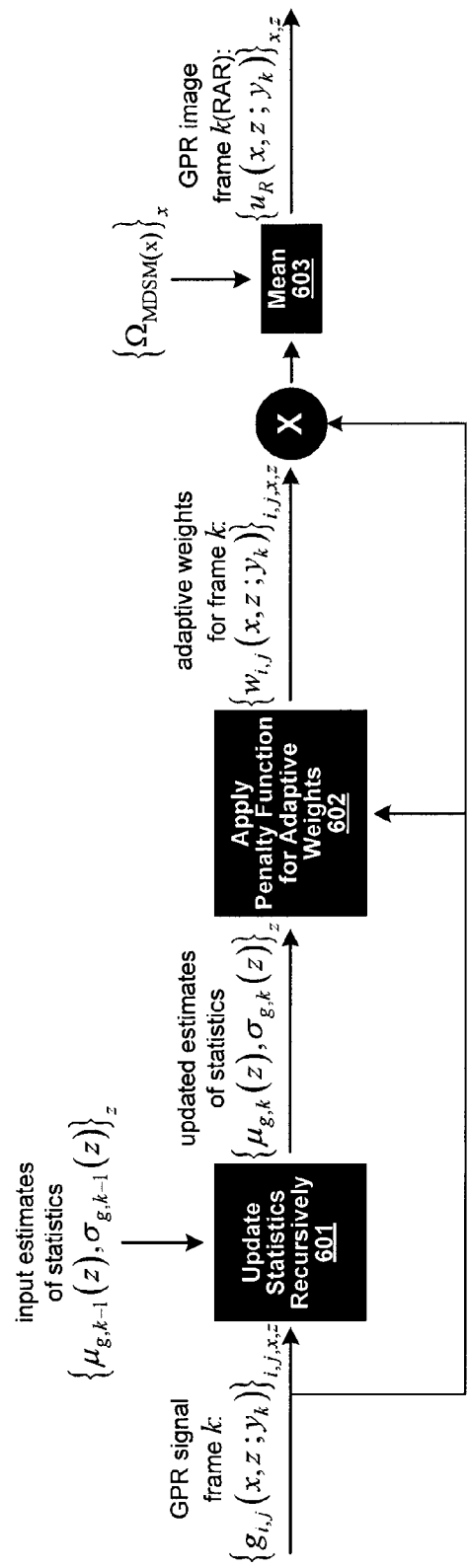
FIG. 6 is a block diagram that illustrates the generation of a real aperture radar image using dynamic weights.

FIG. 6 is a block diagram that illustrates the generation of a real aperture radar image using dynamic weights. The update statistics recursively function 601 receives a signal frame and the prior statistics and updates the running mean and standard deviation. The apply penalty function 602 generates the weights for each pixel. The mean function 603 sets the value of each pixel in the real aperture radar image frame to the mean of the weighted contributions of the samples for each transmitter and receiver pair.

The imaging and detection system sets the weight for a signal sample to a value between 0 and 1 as represented by the following equation:

$$w_{i,j}(x,z;y_k) = p(g_{i,j}(x,z;y_k); \mu_{g,k}(z), \sigma_{g,k}(z)) \tag{17}$$

where $w_{i,j}(x,z;y_k)$ represents the weight for the contribution of the signal of transmitter and receiver pair $T_iR_j$ to the pixel in row z and column x of the real aperture image frame, $\mu_{g,k}(z)$ represents a running mean at down-track location k of the samples that contribute to row z, $\sigma_{g,k}(z)$ represents a running standard deviation at down-track location k of the samples that contribute to row z, $g_{i,j}(x,z;y_k)$ represents the sample at down-track location k contributed by the transmitter and receiver pair $T_iR_j$ to the pixel at row z and column x, and p represents a penalty function. The imaging and detection system represents the penalty function by the following equation:

$$p(g; \mu_g, \sigma_g) = \begin{cases} 0 & |g - \mu_g| \le n_L \sigma_g \\ 1 & |g - \mu_g| \ge n_H \sigma_g \\ \frac{|g - \mu_g - n_L \sigma_g|}{(n_H - n_L)\sigma_g} & \text{otherwise} \end{cases} \tag{18}$$

where g represents the signal sample and $n_L$ and $n_H$ represent the range of numbers of standard deviations from the mean of the sample values over which the weight varies linearly. The imaging and detection system perform RAR imaging using the following equation:

$$u_R(x, z; y_k) \underset{(i,j) \in \Omega_{MDSM}(x)}{\text{mean}} [w_{i,j}(x, z; y_k) \cdot g_{i,j}(x, z; y_k)] \tag{19}$$

where $u_R(x,z;y_k)$ represents the pixel value in the RAR image for cross-track location x, depth z, and down-track location $y_k$. In some embodiments, the imaging and detection system may set the weights to vary in a non-linear fashion. The imaging and detection system represents the running mean of the signals that contribute to the pixels in a row by the following equation:

$$\mu_{g,k}(z) \triangleq \underset{\substack{(i,j) \in \Omega_{MDSM}(x) \\ l=0\ldots k}}{\text{mean}} g_{i,j}(x, z; y_l) \tag{20}$$

The running variance (from which the running standard deviation is calculated) of the signals that contribute to the pixels in a row is derived by the following equation:

$$\sigma_{g,k}^2(z) \triangleq \underset{\substack{(i,j) \in \Omega_{MDSM}(x) \\ l=0\ldots k}}{\text{var}} g_{i,j}(x, z; y_l) \tag{21}$$

The imaging and detection system calculates the running mean of samples in Equation 20 at current down-track location k for each row z recursively by adding the mean computed for the current down-track location to the sum of means computed for prior down-track locations and computing the mean of the result. The imaging and detection system similarly calculates the running mean of squared samples at current down-track location k for each row z recursively. The imaging and detection system then calculates the running variance of samples in Equation 21 at current down-track location k for each row z as the running mean of squared samples minus the square of the running mean of samples.

In some embodiments, the imaging and detection system assesses the statistical significance of transmitter and receiver pair contributions to a pixel using an unsupervised binary classifier, thereby eliminating the need to choose a value for the multistatic degree n of Equation 14. The imaging and detection system retrieves the sample from each transmitter and receiver pair that contributes to a particular pixel for a total of $N^2$ samples represented by the set $\{s_k\}$. The imaging and detection system then sorts the samples. The imaging and detection system then generates a set of the running means and variances from both the left and right directions from the set $\{s_k\}$. The set of running means generated from the left direction would have an element for each of the samples with each element being the mean of the corresponding sample and all samples to the left. The set of running means generated from the right direction would have an element for each of the samples with each element being the mean of the corresponding sample and all samples to the right. The imaging and detection system identifies the value s* representing the threshold value of a statistically significant sample as the first (or lowest element) in the set $\{s_k\}$ that satisfies the condition of the following equation:

$$s_k - \mu_{LK} > \mu_{RK} - s_k \text{ and } \mu_{LK} - \mu_{RK} > \sigma_{LK} + \sigma_{RK} \tag{22}$$

where $s_k$ represents a sample, $\{\mu_{LK}\}$ represents the set of means from the left direction, $\{\mu_{LK}\}$ represents the set of means from the right direction, $\{\sigma_{LK}^2\}$ represents the set of variances from the left direction, and $\{\sigma_{LK}^2\}$ represents the set of variances from the right direction. If there exists an s* value that satisfies the condition of equation 22, the imaging and detection system considers all samples with a value greater than s* as statistically significant and uses only those samples to generate the pixel of the real aperture radar image frame. If s* does not exist, then the imaging and detection system generates the pixel from all the samples.

In some embodiments, the imaging and detection system may automatically determine on a per-pixel or per-column basis which of the transmitter and receiver pairs $T_iR_j$ to use in computing the values for individual pixels. To identify the transmitter and receiver pairs, the imaging and detection system applies a segmentation algorithm to the N×N arrays of weighted return samples. The imaging and detection system may weight the return samples using the weights as specified by Equation 17. The imaging and detection system maintains one N×N array for each pixel or column. The imaging and detection system may apply a standard segmentation algorithm based, for example, on region growing or the watershed principle, to identify portions (or segmented regions) of the N×N array, that are populated by the transmitter and receiver pairs $T_iR_j$, that are to contribute to the pixel values of a real aperture radar image. Suitable segmentation algorithms are well-known such as those described Meyer, F. and Maragos, P., "Multiscale Morphological Segmentations based on Watershed, Flooding, and Eikonal PDE," Scale-Space '99, LNCS 1662, pp. 351-362, published by Springer-Verlag Berlin Heidelberg 1999.

Image Post-Processing

The imaging and detection system processes the reconstructed image frames (which, by construction, only contain pixels with non-negative values) to attenuate the effects of surface bounce and other sources of clutter. The imaging and detection system processes a reconstructed image frame by background subtraction, filtering of noise and clutter; and restoration of the spot. To separate subsurface objects of limited down-track extent in the foreground from background, the imaging and detection system optionally subtracts background from each reconstructed image frame $u_k$ (for down-track location k) by subtracting the mean of corresponding pixels from previous frames from each pixel in the current frame and setting negative differences to zero. The imaging and detection system represents the resulting pixel-wise subtracted image frame as $\dot{u}_k$ for down-track location k. High residual pixel magnitudes from pixel-wise subtraction indicate the possible presence of a subsurface object. To separate subsurface objects of limited cross-track extent in the foreground from background, the imaging and detection system further optionally subtracts background from each row by subtracting the mean plus some multiple of the standard deviation of pixels on a given row of the current image frame from all pixels on that row (i.e., at the same depth), and sets negative differences to zero. The imaging and detection system uses a default multiple of 1 on the standard deviation, which can be overridden. High residual pixel magnitudes from row-wise subtraction indicate the possible presence of a subsurface object. Row-wise subtraction also partially compensates for attenuation in pixel amplitudes with increasing depth.

To further separate objects in the foreground from background, the imaging and detection system optionally subtracts the background from each frame by subtracting from each pixel in the current frame (after optional pixel-wise and row-wise subtraction), the running mean plus some multiple (a default of 1, which can be overridden) of the running standard deviation of pixel values in image frames (after optional pixel-wise and row-wise subtraction). The imaging and detection system sets negative differences to zero. In this way, the imaging and detection system may consider a pixel to be statistically insignificant and set it to zero if its value is less than the running mean plus a designated number of running standard deviations. The imaging and detection system represents the resulting clipped image frame as $u'_k$ for down-track location k.

The imaging and detection system employs a combination of filters to suppress clutter and noise (e.g., speckle noise) from the clipped image frame. The imaging and detection system applies a first segmentation filter to the clipped image frame that sets all pixels to zero except those in the region of highest total value or energy (i.e., the spot). This first segmentation filter segments the clipped image frame into regions of non-zero pixels using a standard region growing algorithm with a default neighborhood that can be overridden. The first segmentation filter then sets all pixels to zero except those in the region with the highest energy. If a subsurface object is present, it will typically be correspond to the region with the highest energy. The image frame produced by the first segmentation filter is represented as $u''_k$ for down-track location k.

The imaging and detection system then applies to each pixel of the first filtered image frame $u''_k$ a median filter of duration 2m+1 that is derived from frames $\{u''_k\}_{j=k-m}^{k+m}$, resulting in a second filtered image frame. In one embodiment, the imaging and detection system may apply a median filter that is derived from that same pixel at prior down-track locations. Such a median filter may, however, suppress the pixels too heavily. In some embodiments, the imaging and detection system applies a spatially assisted median filter to each pixel that is derived not only from that pixel at other down-track locations but also from pixels in a neighborhood (e.g., a rectangular neighborhood) of that pixel. The spatially assisted median filter allows a pixel to be median filtered only when the value of every non-zero pixel in its neighborhood is at least as large as its median. The spatially assisted median filter applied to each pixel to generate a second filtered image is represented by the following algorithm:

---
Algorithm 1
---

1. $\mu_{k-m}(x, z) = \text{median } \{u''_j(x, z)\}_{j=k-2m}^{k}$
2. $\Delta_{k-m}(x, z) = u''_{k-m}(x, z) - \mu_{k-m}(x, z)$
3. $\Omega_{k-m}(x, z) = \{(x', z') \in \text{neighborhood }(x, z) : u''_{k-m}(x', z') > 0\}$
4. $\Delta^*_{k-m}(x, z) = \min_{(x',z') \in \Omega_{k-m}(x,z)} \Delta_{k-m}(x', z')$
5. $v'_{k-m}(x, z) = \begin{cases} u''_{k-m}(x, z) & \Delta^*_{k-m}(x, z) \leq 0 \\ \mu_{k-m}(x, z) & \text{otherwise} \end{cases}$ Step 1 of algorithm 1 calculates the median energy of the pixels from the first segmentation filtered image frames for m track locations before and after the target down-track location k−m. The number of track locations m has a default value which may be overridden by the user. Step 2 calculates the difference between each pixel from the first segmentation filtered image frame at down-track location k−m and its median value. Step 3 identifies a neighborhood around each pixel of the first filtered image frame of the target down-track location such that each pixel in the neighborhood is greater than zero, where neighborhood(x,z) has a default specification that can be overridden. Step 4 identifies the minimum of the differences as calculated in step 2 of the pixels in the neighborhood of the pixel. Step 5 sets the pixel of the second filtered image frame to the value of the first filtered image frame $u''_k$ if the minimum difference is not positive and to the median energy otherwise. The result of the algorithm is that a non-zero pixel of the first segmentation filtered image frame is replaced by its median only when all the pixels in its neighborhood are larger than their respective medians.

The imaging and detection system then applies a depth filter to the resulting filtered image frame to remove areas of energy with thickness in the depth direction that are essentially too small to represent an object. A minimal thickness of $\Delta_z$ pixels in the depth direction is specified by a default value that can be overridden. The imaging and detection system processes each column of the filtered image frame separately. If a pixel is non-zero, then the imaging and detection system sets that pixel to zero when the number of pixels of value zero in that column within $\pm\Delta_z$ rows of the current row exceeds $\Delta_z$.

The imaging and detection system then applies a second segmentation filter (identical to the first) to the resulting filtered image frame, resulting in a spot filtered image frame represented as $v'_{k-m}$. The result is an image in which only the pixels in the spot (if any) are nonzero.

The imaging and detection system then enlarges the spot in $v'_{k-m}$ using Algorithm 2. The imaging and detection system then restores the values of the pixels in the enlarged spot to their un-attenuated values from the pixel-wise subtracted image frame $\dot{u}_{k-m}$, thereby increasing the probability of detecting a subsurface object.

---
Algorithm 2
---

1. $u_{crit}(\rho) = \text{percentile } \rho \; \dot{u}_k(x, z)$
   $(x,z) \in \text{spot}(v'_k)$ $v_k' = \dot{u}_k$
   $v_k'(x, z) = 1 + u_{crit}(\rho) \; \forall (x, z) \in \text{spot }(v_k')$
2. $(x_{seed}, z_{seed}) = $ first element of spot $(v_k')$
   $\text{spot}(v_k) = \text{regionGrow}(v_k', (x_{seed}, z_{seed}), u_{crit}(\rho), \text{neighborhood})$ -continued Algorithm 2

3.
$$v_k(x, z) = \begin{cases} \dot{u}_k(x, z) & (x, z) \in \text{spot}(v_k) \\ 0 & \text{otherwise} \end{cases}$$

Step 1 of algorithm 2 calculates a default percentile ρ (which may be overridden) of pixel values from $\dot{u}_k$ that belong to the spot extracted from $v'_k$. Step 2 temporarily sets $v'_k$ to $\dot{u}_k$ and then sets each spot pixel value to the value plus one. Step 2 then enlarges the spot in the temporary image frame $v'_k$ to encompass neighboring pixels whose values are larger than the percentile value. The resulting region will include all the pixels of the original and may be augmented with additional neighboring pixels, resulting in a fully enlarged spot. Step 3 forms the post-processed image frame $v_k$ by assigning un-attenuated value of pixels from $\dot{u}_k$ to the corresponding pixels in the fully enlarged spot.

Object Detection

The imaging and detection system extracts a detection statistic from each post-processed image frame $v_k$, transforming the sequence of post-processed image frames into a time series of detection statistic values. An object is said to be detected in post-processed image frames for which the detection statistic value exceeds a prescribed detection threshold. In practice, time series of detection statistic values can exhibit upward trends that are correlated with surface roughness, and which are also sensitive to surface type, soil type, soil moisture content, etc. These trends can dramatically reduce detection-false alarm rate performance. Time series are normally detrended by subtracting a moving average from each time series sample. However, buried object detection is inherently causal, that is detection decisions preferably should be made before vehicles drive over buried objects. In this case, the moving average window should trail the current vehicle location down-track, which means that the moving window applied to a specific time series sample should trail that sample. Classical time series detrending algorithms based on causal moving averages are thus typically unable to react quickly to sudden changes in surface or soil conditions. Worse yet, they often produce artifacts at locations of sudden change in the surface that can be incorrectly interpreted as buried objects.

In some embodiments, the imaging and detection system addresses this problem by using an instantaneously self-detrending detection statistic, referred to herein as the spot ratio $r_k$ defined by the following equation:

$$r_k \triangleq \begin{cases} e_k/c_k & c_k > 0 \\ 0 & c_k = 0 \end{cases} \quad (23)$$

where $e_k$ represents the spot energy (the sum of pixels values in post-processed image frame $v_k$ that lie within the spot) and $c_k$ represents the level of frame clutter (the median over all pixel values in the reconstructed image frame $u_k$ that $v_k$ was derived from). The $e_k$ component of spot ratio is sensitive to buried objects, as buried objects are highly correlated with bright spots in post-processed image frames. The $e_k$ component is also sensitive to roughness in the surface, as surface roughness can also be somewhat correlated with bright spots. Since the $c_k$ component of spot ratio is highly correlated with surface roughness, it provides an effective detrending mechanism for the time series $\{r_k\}$ of spot ratio values.

The imaging and detection system may apply a size filter to the spot in the post-processed image to remove spots that are too small or too large to represent a subsurface object. The user may specify the minimum and maximum admissible areas (sizes) for spots. The imaging and detection system multiplies the detection statistic by 1 for spots within the range of minimum and maximum areas and by a penalty factor that may decrease linearly for areas outside the minimum and maximum areas. The rate of decrease may be specified by a user.

The imaging and detection system applies a local peak filter to the time series of detection statistic values to remove multiple peaks that may represent the same object and to reduce ambiguity as to the location of a subsurface object. The imaging and detection system allows the user to override the default minimum number of admissible track locations between peaks. The imaging and detection system then detects an object when the detection statistic exceeds a peak threshold. The peak threshold may be determined empirically based on samples collected from known subsurface objects.

Figure 7:
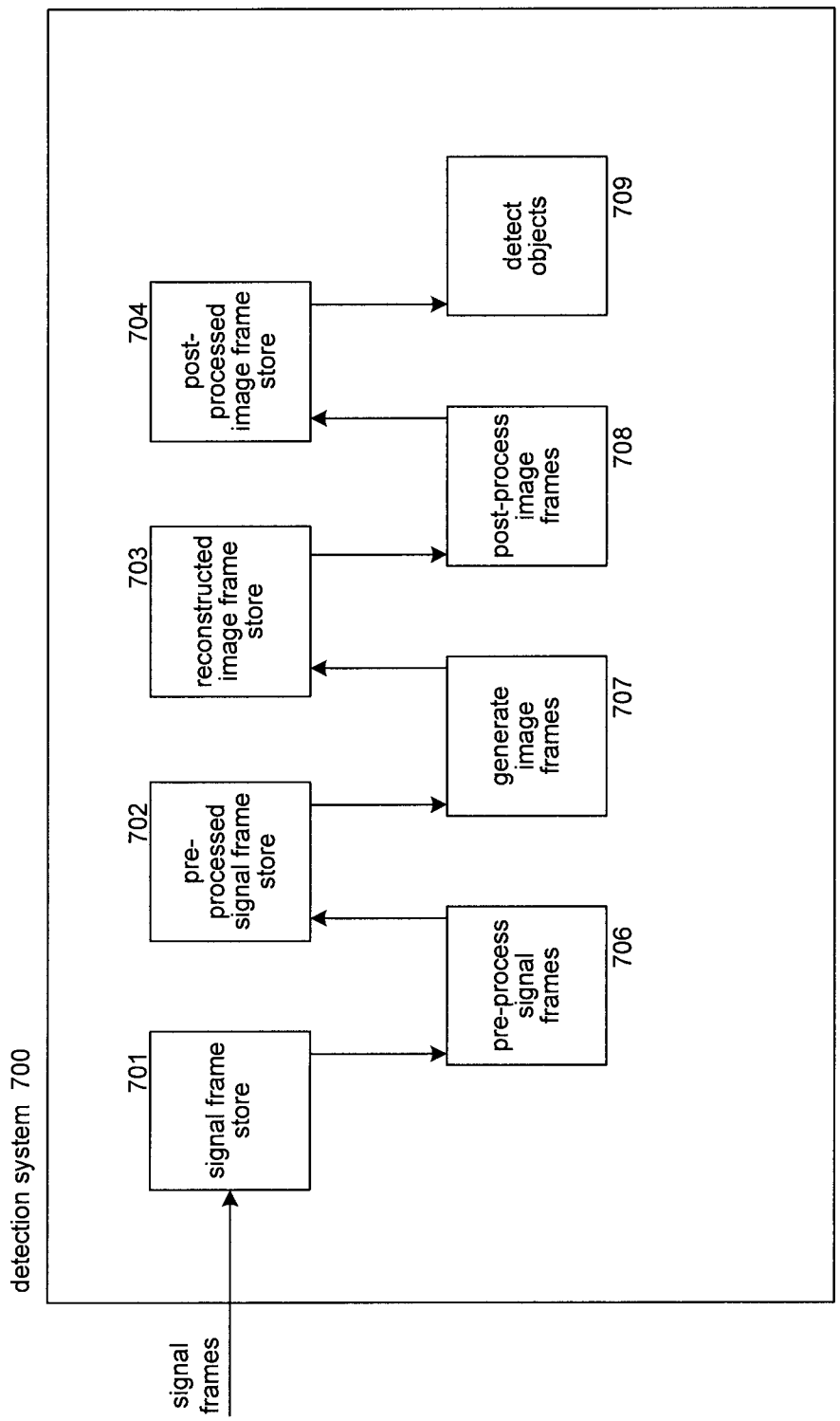
FIG. 7 is a block diagram that illustrates components of the imaging and detection system in some embodiments.

FIG. 7 is a block diagram that illustrates components of the imaging and detection system in some embodiments. Because some of the processing of an image frame for one down-track location may rely on image frames of later down-track locations, the imaging and detection system may delay some of its processing until signal frames have been collected for several subsequent down-track locations. In addition, the imaging and detection system may not perform the peak detection once for every down-track location, but rather may generate the detection statistics for a small range of subsequent down-track locations and then perform peak detection once for the entire range. The imaging and detection system 700 receives signal frames and stores them in a signal frame store 701. A "pre-process signal frames" component 706 inputs the signal frames, pre-processes the signal frames, and stores the pre-processed signal frames in a pre-processed signal frame store 702. A "generate image frames" component 707 inputs the pre-processed signal frames, generates the reconstructed image frames, and stores the reconstructed image frames in a reconstructed image frame store 703. A "post-process image frames" component 708 inputs the reconstructed image frames, performs the post-processing of the reconstructed image frames, and stores the post-processed image frames in a post-processed image frame store 704. A "detect objects" component 709 inputs the post-processed image frames, generates a detection statistic for each frame, identifies peaks with the detection statistics, and when a peak of sufficient height is detected, outputs that an object has been detected.

Figure 8:
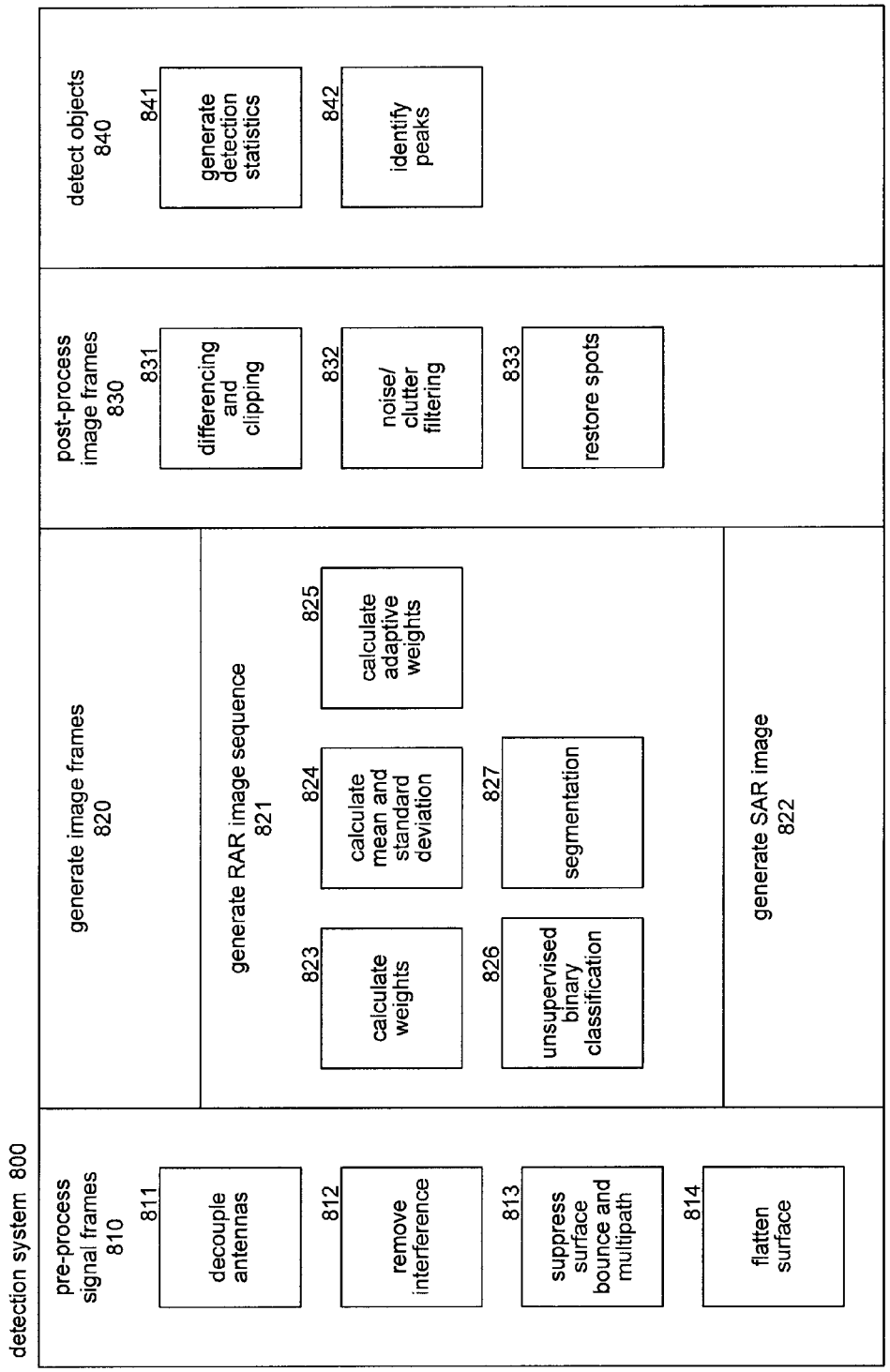
FIG. 8 is a block diagram that illustrates each of components of the imaging and detection system in some embodiments.

FIG. 8 is a block diagram that illustrates each of the components of the imaging and detection system in some embodiments. As described above, an imaging and detection system 800 includes a "pre-process signal frames" component 810, a generate image frames component 820, a "post-process image frames" component 830, and a "detect objects" component 840. The "pre-process signal frames" component includes a "decouple antenna" component 811, a "remove interference" component 812, a "suppress surface bounce and multipath" component 813, and a "flatten surface" component 814. The "generate image frames" component includes a "generate real aperture radar image sequence" component 821 and a "generate synthetic aperture radar image" component 822. The "generate real aperture radar image sequence" component includes a "calculate weights" component 823, a "calculate mean and standard deviation" component 824, an "unsupervised binary classifier" component 826, and a segmentation component 827. The "calculate weights" component calculates the weight for samples associated with specific transmitter and receiver pairs based on statistical significance as illustrated in FIG. 6 and Equations 17-21. The "unsupervised binary classifier" component assesses the statistical significance of samples associated with specific transmitter and receiver pairs by Equation 22 and accompanying text. The segmentation component applies a segmentation algorithm to identify the transmitter and receiver pairs that contribute samples to each pixel or column of the real aperture radar image. The "post-process image frames" component includes a "differencing and clipping" component 831, a "noise/clutter filtering" component 832, and a "restore spots" component 833. The "detect objects" component includes a "generate detection statistics" component 841 and an "identify peaks" component 842.

The computing devices on which the imaging and detection system may be implemented may include a central processing unit and memory and may include input devices (e.g., keyboard and pointing devices), output devices (e.g., display devices), and storage devices (e.g., disk drives). Computer-readable media include computer-readable storage media and data transmission media. The computer-readable storage media include memory and other storage devices that may have recorded upon or may be encoded with computer-executable instructions or logic that implement the imaging and detection system. The data transmission media is media for transmitting data using signals or carrier waves (e.g., electromagnetism) via a wire or wireless connection. Various functions of the imaging and detection system may also be implemented on devices using discrete logic or logic embedded as an application-specific integrated circuit. The imaging and detection system may be implemented on a computer system that is local to a vehicle to which the linear array of antennas is mounted for processing the return signals locally. Alternatively, one or more of the components may be implemented on a computer system that is remote from the linear array. In such an alternative, the data used by the various components (e.g., return signals and image frames) may be transmitted between the local computing system and remote computer system and between remote computing systems.

The imaging and detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 9:
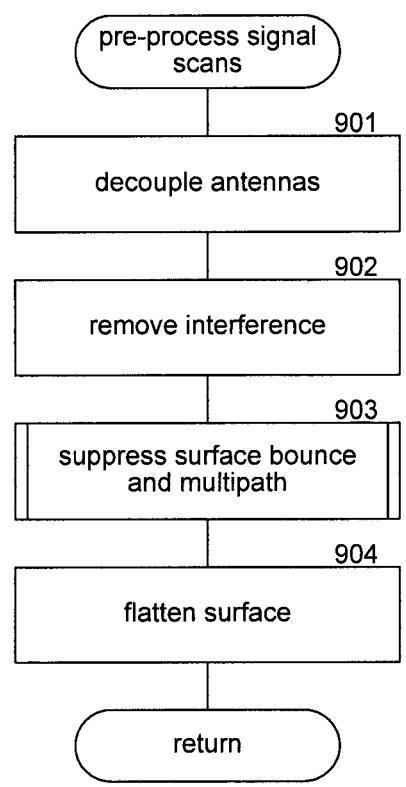
FIG. 9 is a flow diagram that illustrates a "pre-process signal scans" component of the imaging and detection system in some embodiments.

FIG. 9 is a flow diagram that illustrates the processing of the "down-track signal scan pre-processing" component of the imaging and detection system in some embodiments. A down-track signal scan is a sequence of return signals (a 2D array in which each column is a return signal acquired in sequence down-track) with one down-track signal scan for each transmitter and receiver pair. The component applies various processing techniques to the raw signal scan, resulting in the pre-processed signal scan. In block 901, the component suppresses the effects of antenna coupling by subtracting out of the signal frame a short duration weighted average of amplitudes of each row. In block 902, the component suppresses external interference by applying to each row of the signal frame a very short duration median filter. In block 903, the component invokes the "suppress surface bounce and multipath" component to process the signal frame. In block 904, the component flattens the surface by shifting each column such that the first row of each scan occurs at the surface. The component then returns.

Figure 10:
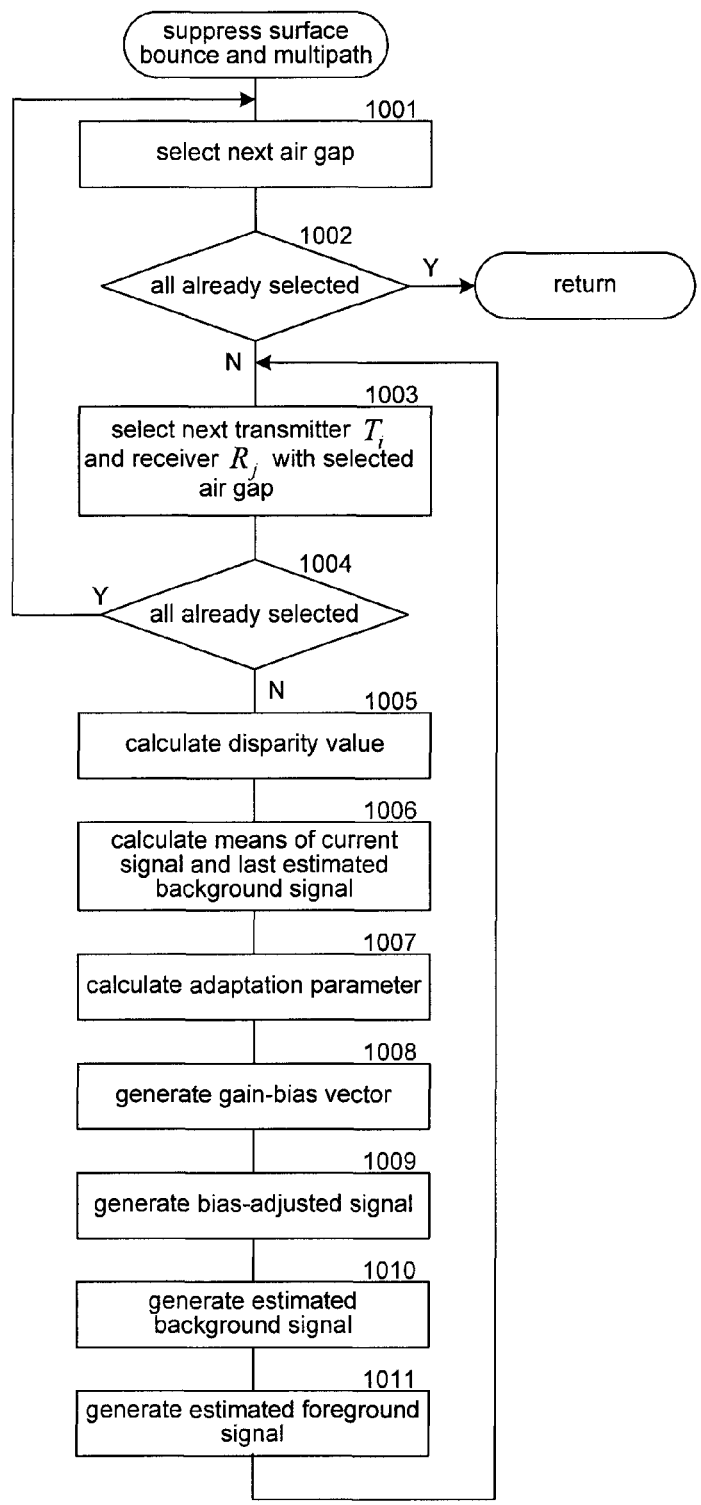
FIG. 10 is a flow diagram that illustrates the processing of a "suppress surface bounce and multipath" component of the imaging and detection system in some embodiments.

FIG. 10 is a flow diagram that illustrates the processing of the "suppress surface bounce and multipath" component of the imaging and detection system in some embodiments. The component implements the RMU algorithm to suppress extraneous signals as described above that is applied to the pre-processed signals from the same transmitter and receiver pair that all share the same air gap (to within a fine tolerance). The component performs the processing of blocks 1005-1011 for return signals associated with each transmitter and receiver pair that share the same air gap. In block 1001, the component selects the next air gap. In decision block 1002, if all the air gaps have already been selected, then the component returns, else the component continues at block 1003. In block 1003, the component selects the next transmitter and receiver pair with the selected air gap. In block 1004, if all the transmitter and receiver pairs for the selected air gap have already been selected, then the component loops to block 1001 to select the next receiver, else the component continues at block 1005. In block 1005, the component calculates the disparity for the selected air gap and transmitter-receiver pair according to Equation 7. In block 1006, the component calculates the mean and standard deviation of the disparities of past pre-processed signals and the current pre-processed signal for the selected transmitter and receiver pair. In block 1007, the component calculates the adaptation parameter for the selected transmitter and receiver pair according to Equation 6. In block 1008, the component calculates a gain-bias vector for the selected transmitter and receiver pair according to Equation 5. In block 1009, the component generates the gain-bias adjusted signal for the selected transmitter and receiver pair according to Equation 4. In block 1010, the component generates the estimated background signal within the current pre-processed signal for the selected transmitter and receiver pair according to Equation 3. In block 1011, the component generates the estimated foreground signal within the current pre-processed signal for the selected transmitter and receiver pair according to Equation 1. The component then loops to block 1003 to select the next transmitter for the selected receiver.

Figure 11:
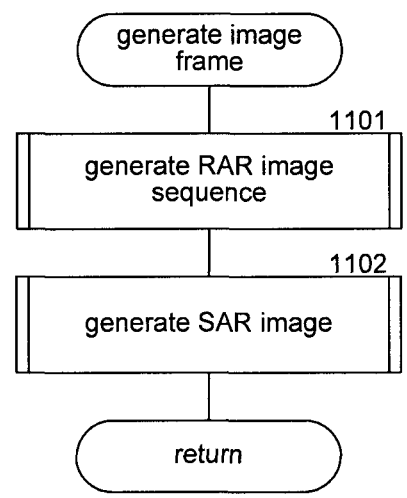
FIG. 11 is a flow diagram that illustrates the processing of a "generate image frame" component of the imaging and detection system in some embodiments.

FIG. 11 is a flow diagram that illustrates the processing of a "generate image frame" component of the imaging and detection system in some embodiments. In block 1101, the component invokes the "generate RAR image sequence" component to generate the real aperture radar image for the current down-track location based on the pre-processed signal frame. In block 1102, the component invokes the "generate synthetic aperture radar image" component to generate the synthetic aperture radar image (i.e., the reconstructed image frame) based on a set of real aperture radar images corresponding to down-track locations adjacent to the current down-track location. The component then returns.

Figure 12:
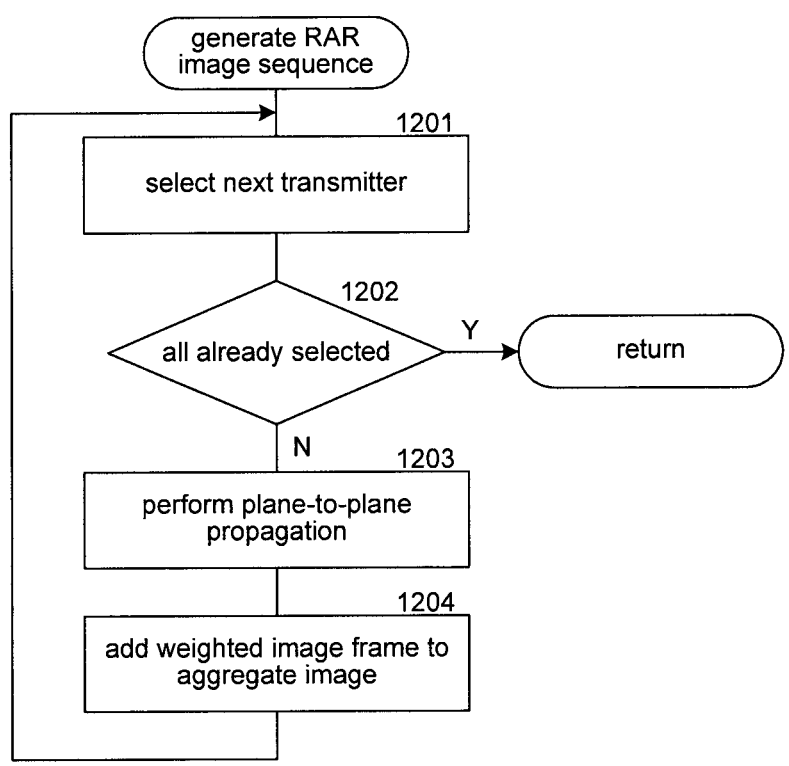
FIG. 12 is a flow diagram that illustrates the processing of a "generate real aperture radar image sequence" component of the imaging and detection system in some embodiments.

FIG. 12 is a flow diagram that illustrates the processing of the "generate real aperture radar image sequence" component of the imaging and detection system in some embodiments. In block 1201, the component selects the next transmitter. In decision block 1202, if all the transmitters have already been selected, then the component returns, else the component continues at block 1203. In block 1203, the component performs plane-to-plane propagation for the selected transmitter to generate a contribution image frame that contains the contribution of the selected transmitter to the real aperture radar image for the current down-track location. In block 1204, the component aggregates the contribution image frame into the real aperture image frame and then loops to block 1201 to select the next transmitter. The component may aggregate the contribution image frame using a weight for each pixel in accordance with Equation 10. In some embodiments, the component may also use a spatially adaptive migration technique as described above when generating the real aperture radar image frame. For example, the component may use a fixed multistatic degree to identify the transmitter and receiver pairs that contribute to a column of the real aperture radar image frame. The component may also use a segmentation algorithm or an unsupervised binary classifier to determine the transmitter and receiver pairs and their weights that contribute to the pixels of a real aperture radar image.

Figure 13:
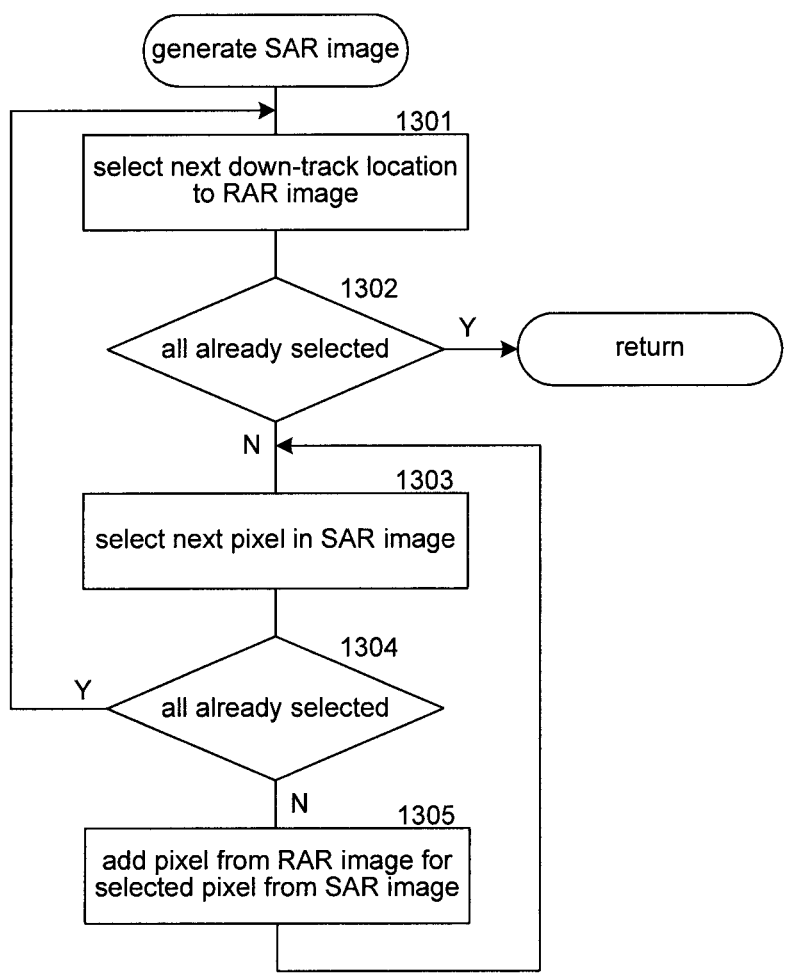
FIG. 13 is a flow diagram that illustrates the processing of a "generate synthetic aperture radar image" component of the imaging and detection system in some embodiments.

FIG. 13 is a flow diagram that illustrates the processing of the "generate synthetic aperture radar image" component of the imaging and detection system in some embodiments. The component inputs the real aperture radar image frames and outputs the corresponding synthetic aperture radar image frame. In block 1301, the component selects the next down-track location that is within the window for generating the synthetic aperture radar image. In decision block 1302, if all such down-track locations have already been selected, then the component returns, else the component continues at block 1303. In block 1303, the component selects the next pixel of an image frame. In decision block 1304, if all the pixels have already been selected, then the component loops to block 1301, else the component continues at block 1305. In block 1305, the component adds to the selected pixel of the synthetic aperture radar image frame a corresponding pixel of the selected real aperture radar image frame and then loops to block 1303 to select the next pixel. The corresponding pixel from the real aperture radar image is specified in accordance with Equation 9.

Figure 14:
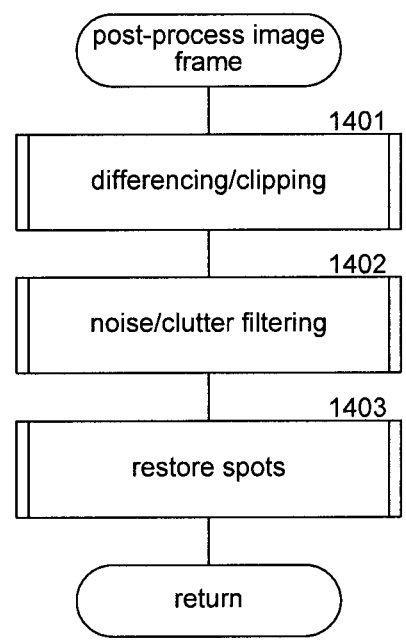
FIG. 14 is a flow diagram that illustrates the processing of a "post-process image frame" component of the imaging and detection system in some embodiments.

FIG. 14 is a flow diagram that illustrates the processing of the "post-process image frame" component of the imaging and detection system in some embodiments. The component inputs the reconstructed image frame and outputs the post-processed image frame. In block 1401, the component invokes the "differencing/clipping" component to generate a clipped image frame. In block 1402, the component invokes the "noise/clutter filtering" component to generate the filtered image frame. In block 1403, the component invokes the "restore spots" component to generate the post-processed image frame and then returns.

Figure 15:
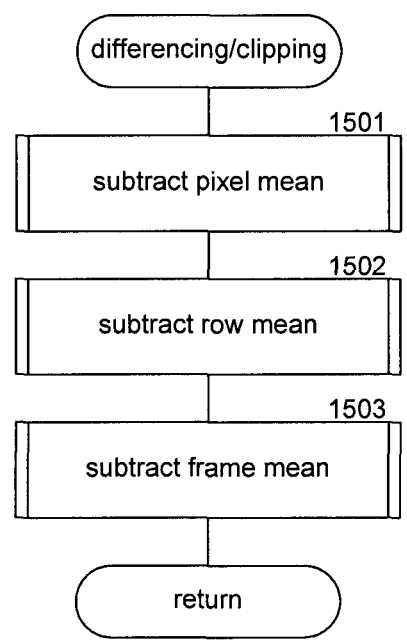
FIG. 15 is a flow diagram that illustrates the processing of a "differencing/clipping" component of the imaging and detection system in some embodiments.

FIG. 15 is a flow diagram that illustrates the processing of the "differencing/clipping" component of the imaging and detection system in some embodiments. The component inputs the reconstructed image frame and outputs the clipped image frame. In blocks 1501 and 1502, the component invokes a "subtract pixel mean" component and a subtract row mean component to generate a differenced image frame from the reconstructed image frame. In block 1503, the component invokes a "subtract frame mean" component to generate a clipped image frame and then returns.

Figure 16:
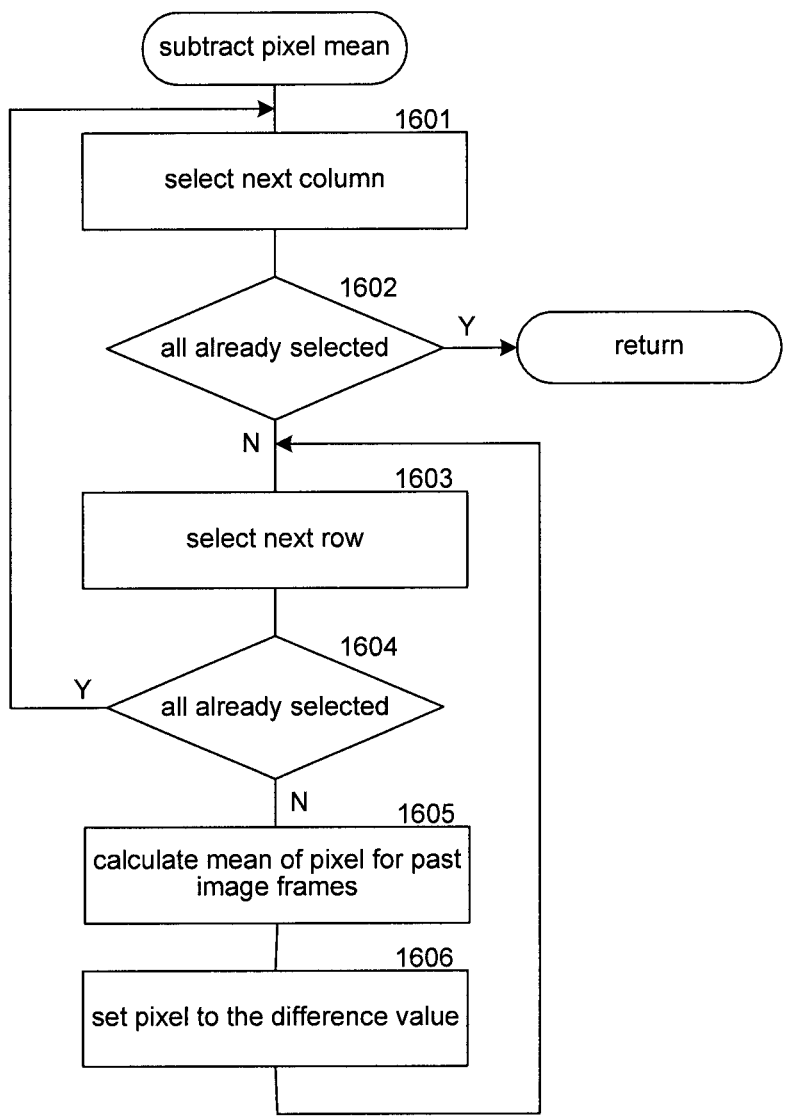
FIG. 16 is a flow diagram that illustrates the processing of a "subtract pixel mean" component of the imaging and detection system in some embodiments.

FIG. 16 is a flow diagram that illustrates the processing of the "subtract pixel mean" component of the imaging and detection system in some embodiments. In block 1601, the component selects the next cross-track location. In decision block 1602, if all the cross-track locations have already been selected, then the component returns, else the component continues at block 1603. In block 1603, the component selects the next row of the image frame. In decision block 1604, if all the rows have been selected, then the component loops to block 1601, else the component continues at block 1605. In block 1605, the component calculates the mean of the pixels at the selected cross-track location and the selected row for past reconstructed image frames. In block 1606, the component sets the pixel of the differenced image frame to the difference between the calculated mean and the corresponding pixel of the current reconstructed image frame and then loops to block 1603 to select the next row.

Figure 17:
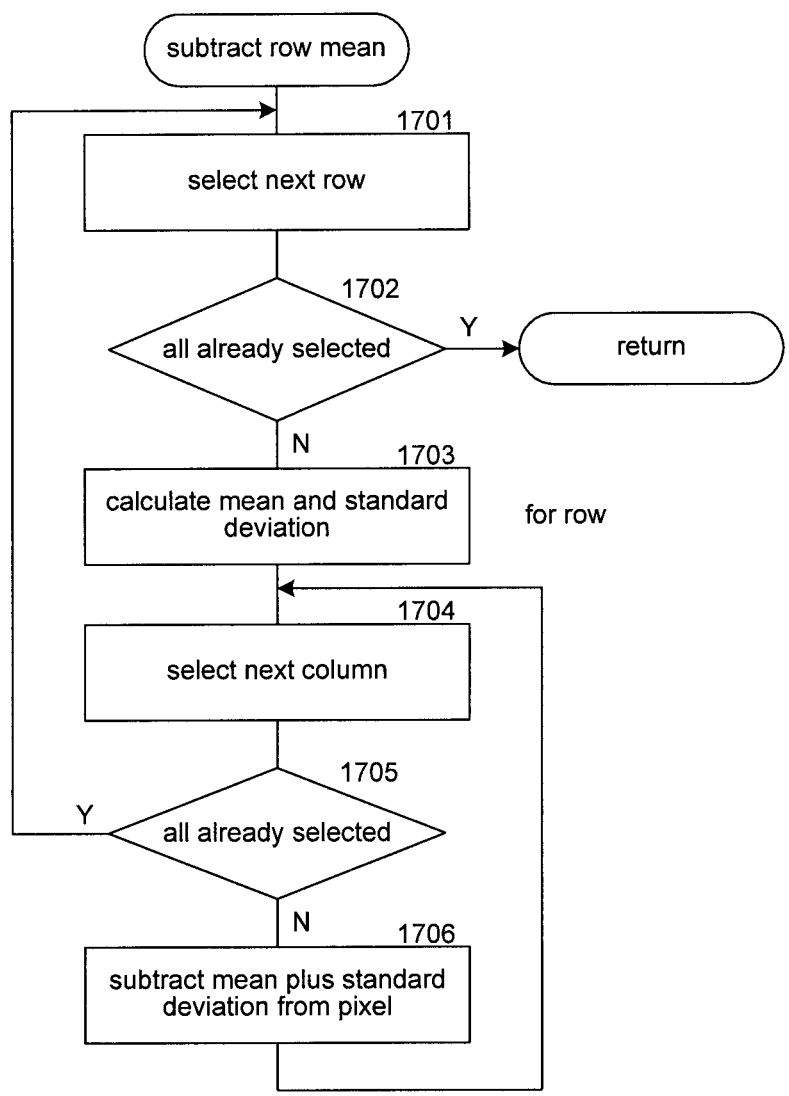
FIG. 17 is a flow diagram that illustrates the processing of a "subtract row mean" component of the imaging and detection system in some embodiments.

FIG. 17 is a flow diagram that illustrates the processing of the "subtract row mean" component of the imaging and detection system in some embodiments. In block 1701, the component selects the next row of the image frame. In decision block 1702, if all the rows have already been selected, then the component returns, else the component continues at block 1703. In block 1703, the component calculates the mean and standard deviation for the selected row of the pixel-wise differenced image frame. In block 1704, the component selects the next column. In decision block 1705, if all the columns have already been selected, then the component loops to block 1701 to select the next row, else the component continues at block 1706. In block 1706, the component subtracts the mean plus some multiple of the standard deviation from the pixel at the selected row and column of the differenced image frame and then loops to block 1704 to select the next column.

Figure 18:
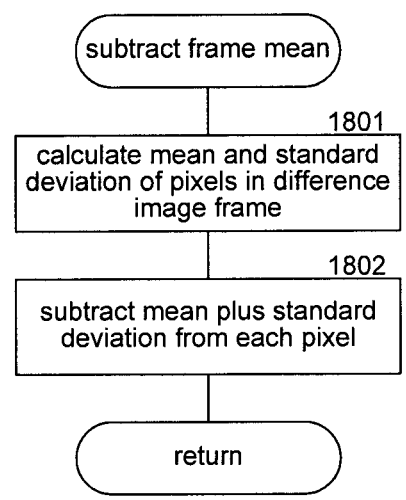
FIG. 18 is a flow diagram that illustrates the processing of a "subtract frame mean" component of the imaging and detection system in some embodiments.

FIG. 18 is a flow diagram that illustrates the processing of the "subtract frame mean" component of the imaging and detection system in some embodiments. The component subtracts the frame mean from the pixels of the pixel-wise and row-wise differenced image frame, resulting in a clipped image frame. In block 1801, the component updates the running mean and the standard deviation for the pixel-wise and row-wise differenced image frame. In block 1802, the component subtracts the mean plus some multiple of the standard deviation from each pixel of the differenced image frame, and then sets the negative differences to zero, to generate the clipped image frame. The multiple of the standard deviation that is used throughout the imaging and detection system may be user-specified and may be any positive or negative number. The component then returns.

Figure 19:
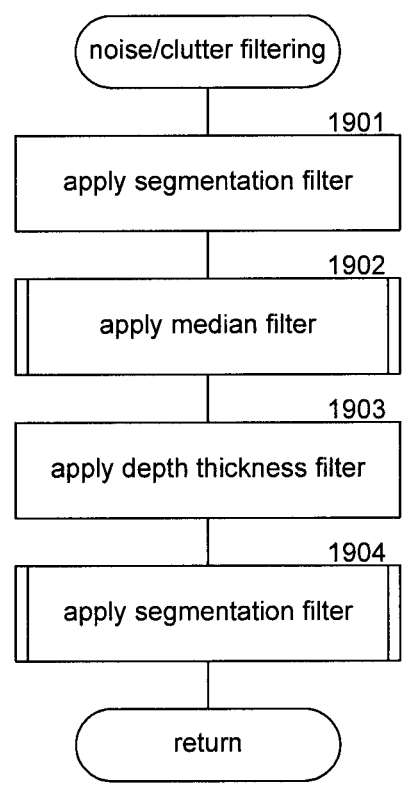
FIG. 19 is a flow diagram that illustrates the processing of a "noise/clutter filtering" component of the imaging and detection system in some embodiments.

FIG. 19 is a flow diagram that illustrates the processing of the "noise/clutter filtering" component of the imaging and detection system in some embodiments. The component inputs the clipped image frame and outputs the post-processed image frame. In block 1901, the component applies a first segmentation filter to the clipped image frame, resulting in the first filtered image frame. In block 1902, the component invokes the median filter component to generate the second filtered image frame. In block 1903, the component applies a depth thickness filter to remove thin spots. In block 1904, the component applies a a second segmentation filter to the filtered image frame to generate a post-processed image frame and then returns.

Figure 20:
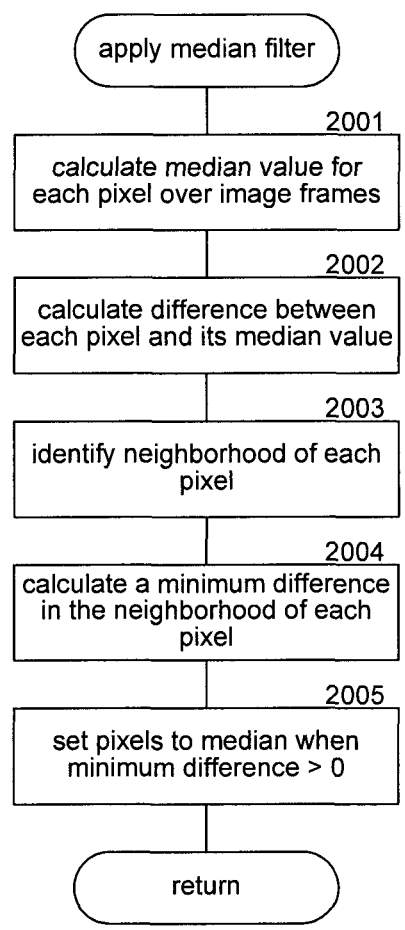
FIG. 20 is a flow diagram that illustrates the processing of a "median filter" component of the imaging and detection system in some embodiments.

FIG. 20 is a flow diagram that illustrates the processing of the "apply median filter" component of the imaging and detection system in some embodiments. In block 2001, the component calculates the median for each pixel of the first filtered image frame for a certain number of down-track locations before and after the current down-track location. In block 2002, the component calculates the difference between each pixel of the first filtered image frame and the median. In block 2003, the component identifies a neighborhood for each pixel of the first filtered image frame. In block 2004, the component identifies the minimum difference within the neighborhood of each pixel of the first filtered image frame. In block 2005, the component sets each pixel of the second filtered image frame to the value of the corresponding pixel of the first filtered image frame when the minimum difference is less than zero and to the median otherwise. The component then returns.

Figure 21:
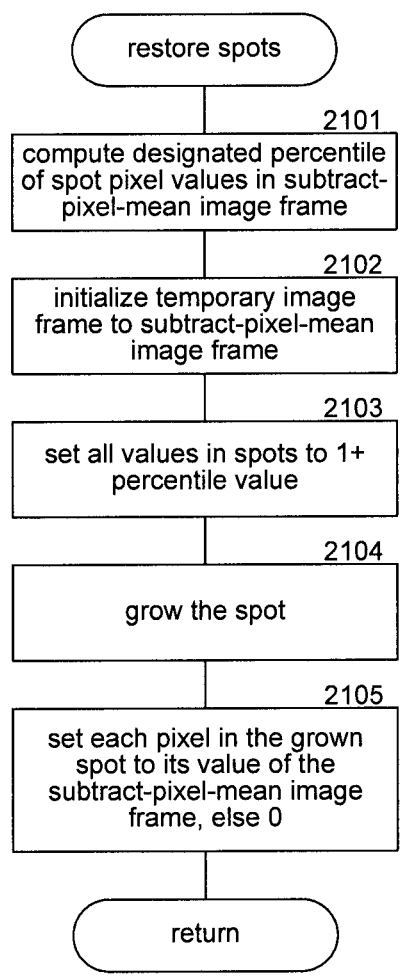
FIG. 21 is a flow diagram that illustrates the processing of a "restore spots" component of the imaging and detection system in some embodiments.

FIG. 21 is a flow diagram that illustrates the processing of the "restore spots" component of the imaging and detection system in some embodiments. The component inputs the second filtered image frame and outputs the post-processed image frame. In block 2101, the component calculates the percentile value of the spot based on the pixels of the corresponding clipped image frame. In block 2102, the component initializes the pixels of a temporary image frame to the subtract-pixel-mean image frame. In block 2103, the component sets the pixels of the temporary image frame that are within the spot to the percentile value plus one. In block 2104, the component selects a seed pixel within the spot and identifies a restored spot that includes the pixels of the original spot. In block 2105, the component sets each pixel in the grown spot to its value in the subtract-pixel-mean image frame; otherwise, the pixel is set to zero. The component then returns.

Figure 22:
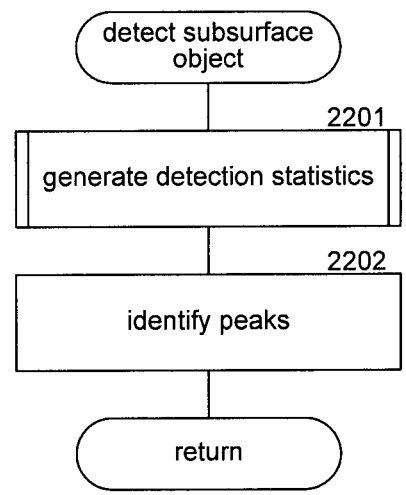
FIG. 22 is a flow diagram that illustrates the processing of a "detect subsurface object" component of the imaging and detection system in some embodiments.

FIG. 22 is a flow diagram that illustrates the processing of the "detect subsurface object" component of the imaging and detection system in some embodiments. In block 2201, the component invokes the "generate detection statistics" component to generate the detection statistics for the post-processed image frame. In block 2202, the component identifies whether the detection statistics over a sequence of previous down-track locations include a peak indicating the presence of a subsurface object at that down-track location.

Figure 23:
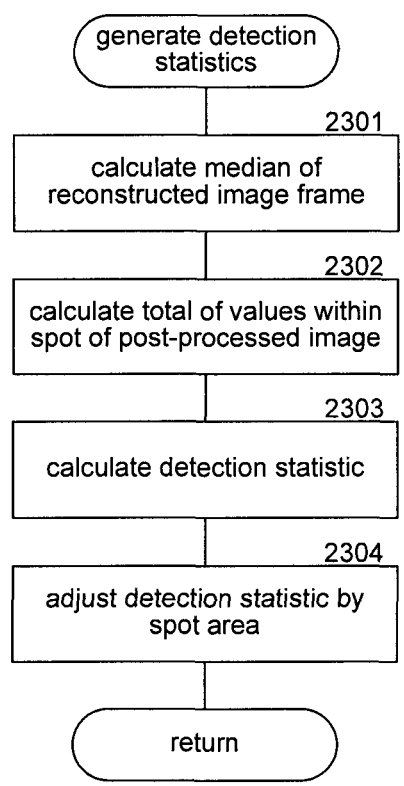
FIG. 23 is a flow diagram that illustrates the processing of a "generate detection statistics" component of the imaging and detection system in some embodiments.

FIG. 23 is a flow diagram that illustrates the processing of the "generate detection statistics" component of the imaging and detection system in some embodiments. The component inputs the post-processed image frame and outputs the detection statistic for a down-track location. In block 2301, the component calculates the median of the reconstructed image frame. In block 2302, the component calculates the total energy of the pixels within the spot of the post-processed image frame. In block 2303, the component calculates the detection statistic. In block 2304, the component adjusts the detection statistic based on the area of the spot and then returns.

From the foregoing, it will be appreciated that specific embodiments of the invention have been described herein for purposes of illustration but that various modifications may be made without deviating from the scope of the invention. Accordingly, the invention is not limited except as by the appended claims.

We claim:

1. A method performed by a computing device for filtering a target image frame in an associated sequence of image frames along a down-track direction, the target image frame having pixels with values, the method comprising:
for target pixels of the target image frame,
calculating by the computing device a median filtered value for the target pixel based on the value of corresponding pixels in each of the image frames in the associated sequence; and
determining by the computing device whether pixels in a neighborhood of the target pixel satisfy a filtering criterion based on values of the pixels in the neighborhood and their associated median filtered values; and
after determining that the filtering criterion is satisfied, replacing by the computing device the value of the target pixel with the calculated median filtered value.

2. The method of claim 1 wherein the determining includes:
calculating a difference between values of pixels of the target image frame in the neighborhood of the target pixel and their respective median-filtered values; and
computing the minimum of the difference values within the neighborhood.

3. The method of claim 2 wherein the filtering criterion satisfied when a minimum of difference values within the neighborhood is greater than zero.

4. The method of claim 1 wherein the neighborhood is a rectangular area of pixels.

5. The method of claim 1 wherein the associated sequence of image frames is generated from return signals collected on a sequence of down-track locations in the vicinity of the target down-track location.

6. The method of claim 5 wherein the return signals are acquired by receivers from ground-penetrating radar signals emitted by transmitters, the transmitters and receivers operating in multistatic mode.

7. The method of claim 6 wherein the ground-penetrating radar signals are emitted into the ground and including determining whether an explosive device is buried based on analysis of a filtered target image frame.

8. A computer-readable storage device that is not a transitory, propagating signal storing computer-executable instructions for controlling a computing device to filter a target image frame in an associated sequence of image frames along a down-track direction, the target image frame having pixels with values, the target image frame being generated from the return signals acquired by receivers from ground-penetrating radar signals emitted by transmitters, by a method comprising:
calculating a median filtered value for a target pixel of the target image based on the value of corresponding pixels in the image frames in the associated sequence;
determining whether pixels in a neighborhood of the target pixel satisfy a filtering criterion based on values of the pixels in the neighborhood and the median filtered values of the pixels in the neighborhood; and
when the filtering criterion is determined to be satisfied, replacing the value of the target pixel with the calculated median filtered value.

9. The computer-readable storage device of claim 8 wherein the determining includes:
calculating a difference between values of pixels of the target image frame in the neighborhood and median-filtered values of pixels of the target image frame in the neighborhood; and
computing a minimum of the difference values within the neighborhood.

10. The computer-readable storage device of claim 9 wherein the filtering criterion satisfied when a minimum of difference values within the neighborhood is greater than zero.

11. The computer-readable storage device of claim 8 wherein the target image frame is represents a synthetic aperture image generated from real aperture images.

12. The computer-readable storage device of claim 8 wherein the transmitters and receivers operate in multistatic mode.

13. The computer-readable storage device of claim 12 wherein the ground-penetrating radar signals are emitted into the ground and including determining whether an explosive device is buried based on analysis of a filtered target image frame.

14. A computing device for filtering a target image frame in an associated sequence of image frames along a down-track direction, the target image frame having pixels with values, the target image frame being generated from the return signals acquired by receivers from ground-penetrating radar signals emitted by transmitters, the transmitters and receivers operating in a multistatic mode, comprising:

a component that calculates a median filtered value for a pixel of the target image based on the value of corresponding pixels in the image frames in the associated sequence;

a component that determines whether pixels in a neighborhood of a target pixel satisfy a filtering criterion based on values of the pixels in the neighborhood and the median filtered values of the pixels in the neighborhood; and a component that when replacing the value of the target pixel with a value derived from values of the pixels in the neighborhood when the criterion is satisfied.

15. The computing device of claim 14 wherein the component that calculates a difference between values of pixels of the target image frame in the neighborhood and median-filtered values of pixels of the target image frame in the neighborhood and computes a minimum of the difference values within the neighborhood.

16. The computing device of claim 15 wherein the filtering criterion satisfied when a minimum of difference values within the neighborhood is greater than zero.

17. The computing device of claim 14 wherein the replaced value for the target pixel in the target image frame is the calculated median filtered value for the target pixel.

18. The computing device of claim 14 wherein the transmitters and receivers operate in multistatic mode.

19. The computing device of claim 14 wherein the ground-penetrating radar signals are emitted into the ground and including determining whether an explosive device is buried based on analysis of a filtered target image frame.

20. The computing device of claim 14 wherein the target image frame represents a synthetic aperture image generated from real aperture images.

* * * * *